(12) United States Patent
Sugiyama

(10) Patent No.: US 11,968,336 B2
(45) Date of Patent: Apr. 23, 2024

(54) PRINTING APPARATUS AND CONTROL METHOD OF PRINTING APPARATUS

(71) Applicant: BROTHER KOGYO KABUSHIKI KAISHA, Nagoya (JP)

(72) Inventor: Ayako Sugiyama, Okazaki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/933,626

(22) Filed: Sep. 20, 2022

(65) Prior Publication Data

US 2023/0089862 A1   Mar. 23, 2023

(30) Foreign Application Priority Data

Sep. 21, 2021   (JP) .................................. 2021-152845
May 31, 2022   (JP) .................................. 2022-089243

(51) Int. Cl.
*G06F 15/00*   (2006.01)
*H04N 1/00*    (2006.01)

(52) U.S. Cl.
CPC ..... *H04N 1/00344* (2013.01); *H04N 1/00424* (2013.01); *H04N 1/0048* (2013.01)

(58) Field of Classification Search
None
See application file for complete search history.

(56) References Cited

U.S. PATENT DOCUMENTS

| 2004/0056910 A1* | 3/2004 | Usui ...................... B41J 2/1752 |
| | | 347/7 |
| 2006/0228123 A1 | 10/2006 | Zaima |
| 2016/0078147 A1* | 3/2016 | Tokuda ............... G06F 16/9577 |
| | | 715/234 |

FOREIGN PATENT DOCUMENTS

| JP | 2006292830 A | 10/2006 |
| JP | 2016194906 A | 11/2016 |
| JP | 2017037596 A | 2/2017 |

* cited by examiner

*Primary Examiner* — Mark R Milia
(74) *Attorney, Agent, or Firm* — Scully, Scott, Murphy & Presser, P.C.

(57) ABSTRACT

A printing apparatus is configured to operate based on a contract concluded with a contractor related to a consumable for the printing apparatus. The printing apparatus includes a mounting unit configured to receive the consumable, a printing unit configured to print an image on a print medium using the mounted consumable, and a controller configured to execute acquisition processing of acquiring arrival time information of a first consumable delivered for the printing apparatus based on the contract, prediction processing of predicting a usable amount of the mounted consumable at an arrival time indicated by the arrival time information acquired in the acquisition processing, and decision processing of deciding an execution mode of maintenance save processing for weakening given maintenance processing of the printing apparatus based on the usable amount predicted in the prediction processing.

17 Claims, 12 Drawing Sheets

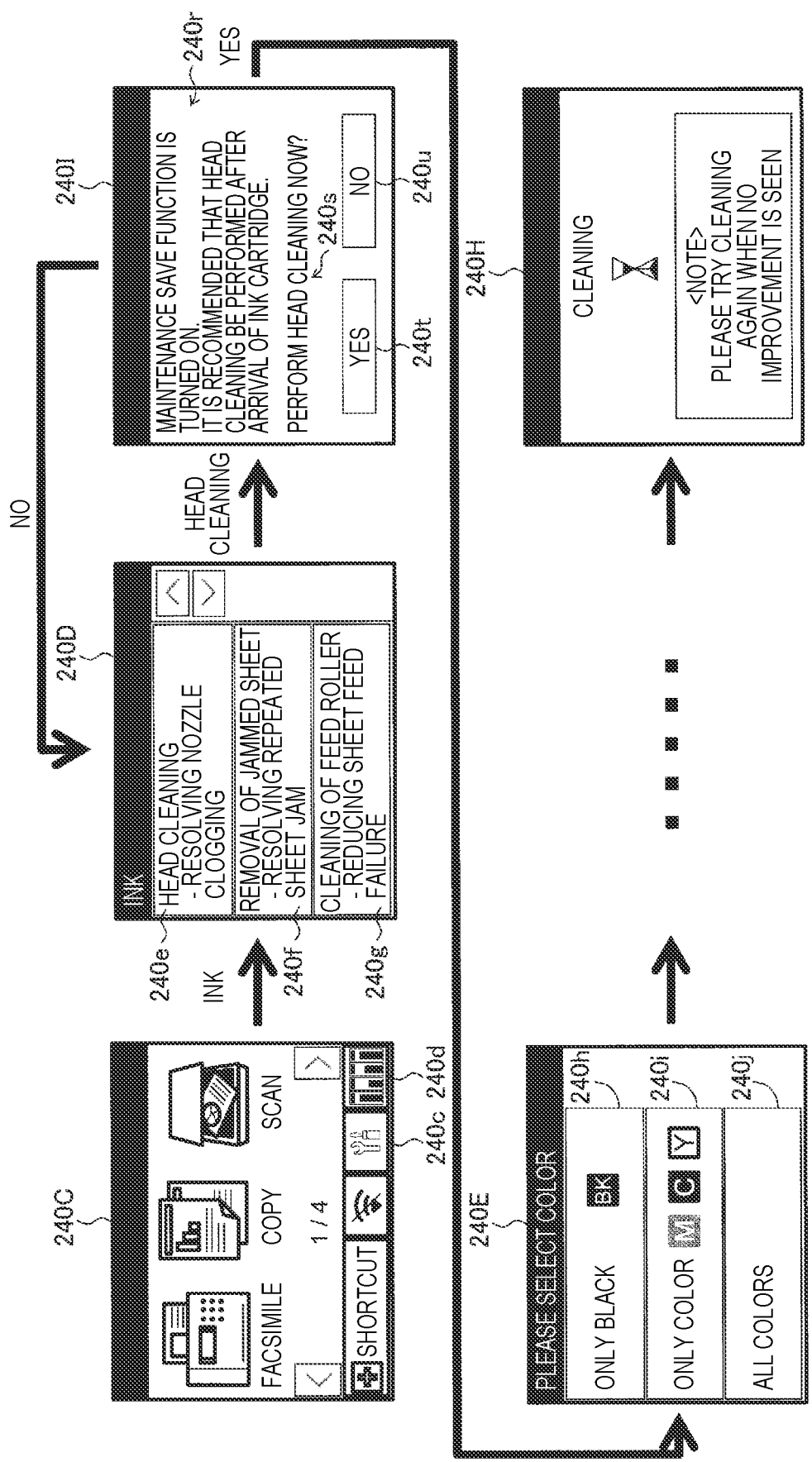

PRINTING APPARATUS AND CONTROL METHOD OF PRINTING APPARATUS

REFERENCE TO RELATED APPLICATIONS

This application claims priorities from Japanese Patent Application Nos. 2021-152845 filed on Sep. 21, 2021, and 2022-089243 filed on May 31, 2022. The entire contents of the priority applications are incorporated herein by reference.

BACKGROUND ART

Conventionally, for example, as described in Patent Literature 1, there is known a technique of shifting to a saving mode in which consumption of a consumable is reduced when an arrival time of the consumable is later than a time when the consumable needs to be replenished.

DESCRIPTION

In recent years, there has been known a method in which a prescribed contract is concluded with a user of a printing apparatus and based on the contract, the user is charged according to a print content. When such a contract is concluded, as a consumable such as a cartridge used in the printing apparatus, a specific consumable (hereinafter, appropriately referred to as a "contract consumable") corresponding to the contract, which is different from a commercially available consumable, is used.

Here, after the contract is concluded, for example, a contract consumable is normally delivered from a given delivery source to a user, but before the delivery arrives, depending on a usage status of the user, a consumable currently mounted on the printing apparatus may be consumed.

When the commercially available consumable is mounted and used, a commercially available consumable may be newly purchased in order to cope with the above consumption, but when the contract consumable is delivered and arrives, the newly purchased commercially available consumable is unnecessary, and thus a purchase cost is wasted for the user. Therefore, it is desirable to extend a life of the consumable as long as possible until the contract consumable arrives.

Further, for example, when a contract consumable based on a past contract is mounted on the printing apparatus and used, the other contract consumable may be newly mounted to cope with the above consumption. In this case, even if a new contract consumable that has been delivered arrives and the other contract consumable is replaced with the arrived contract consumable, a cost of a detached contract consumable itself is not originally borne by the user, and thus there is no particular cost waste. As for a user's psychology, there is a need to replace the other contract consumable with a new contract consumable even if the other contract consumable has a sufficient remaining life when the delivered contract consumable arrives within a relatively short period of time after the other contract consumable is mounted. However, when the other contract consumable cannot be prepared, it is desirable to extend the life of the consumable as long as possible until the delivered contract consumable arrives.

On the other hand, in general, in a printing apparatus, maintenance processing is required at an appropriate timing in order to prevent deterioration of print quality. For example, in an ink jet type printing apparatus, processing such as a purge or brushing corresponds to the maintenance processing, and consumption of consumables occurs during execution of these processing. Depending on the printing apparatus, there are cases where the printing apparatus has a function of automatically executing the maintenance processing and where the maintenance processing is manually executed by a user. When the maintenance processing is automatically or manually executed, the consumable is consumed, and thus, from a viewpoint of extending the life of the consumable as described above, some contrivance is required for execution of the maintenance processing.

As described above, when the contract is concluded with the user, it may be better to perform some appropriate control for the execution of the maintenance processing in the printing apparatus in accordance with a delivery status of the contract consumable. In the above related art, such a point is not particularly considered.

An object of the present disclosure is to provide a printing apparatus and a control method of the printing apparatus capable of performing appropriate control for execution of maintenance processing in accordance with a delivery status of a consumable after a contract is concluded.

According to an aspect of the disclosure, a printing apparatus is configured to operate based on a contract concluded with a contractor related to a consumable for the printing apparatus. The printing apparatus includes a mounting unit configured to receive the consumable, a printing unit configured to print an image on a print medium using the mounted consumable, and a controller configured to execute acquisition processing of acquiring arrival time information of a first consumable delivered for the printing apparatus based on the contract, prediction processing of predicting a usable amount of the mounted consumable at an arrival time indicated by the arrival time information acquired in the acquisition processing, and decision processing of deciding an execution mode of maintenance save processing for weakening given maintenance processing of the printing apparatus based on the usable amount predicted in the prediction processing.

According to another aspect of the disclosure, a control method of a printing apparatus configured to operate based on a contract concluded with a contractor related to a consumable for the printing apparatus, the printing apparatus including a mounting unit configured to receive the consumable and a printing unit configured to print an image on a print medium using the mounted consumable, includes acquiring arrival time information of a first consumable delivered for the printing apparatus based on the contract, predicting a usable amount of the mounted consumable at an arrival time indicated by the arrival time information acquired in the acquiring, and deciding an execution mode of maintenance save processing for weakening given maintenance processing for the printing apparatus in accordance with a prediction result in the predicting.

According to the present disclosure, it is possible to appropriately control a save mode of maintenance processing based on a prediction result of a usable amount when delivery is completed and a first consumable arrives in accordance with a delivery status of the first consumable.

According to the present disclosure, it is possible to perform appropriate control for execution of maintenance processing in accordance with a delivery status of a consumable after a contract is concluded.

FIG. 9 is an explanatory diagram showing an example of transition of screens displayed on the display unit in a case where a user tries to execute the maintenance processing and a maintenance save function is turned ON.

FIG. 11 is an explanatory diagram showing the other example of a screen displayed on the display unit in a case where the user tries to execute the maintenance processing and the maintenance save function is turned ON.

FIG. 12 is an explanatory diagram showing the other example of transition of screens displayed on the display unit in a case where the user tries to execute the maintenance processing and the maintenance save function is turned ON.

Embodiments of the present disclosure will be described with reference to the drawings.

FIRST EMBODIMENT

The first embodiment is an embodiment in which maintenance processing is automatically executed.

Figure 1:
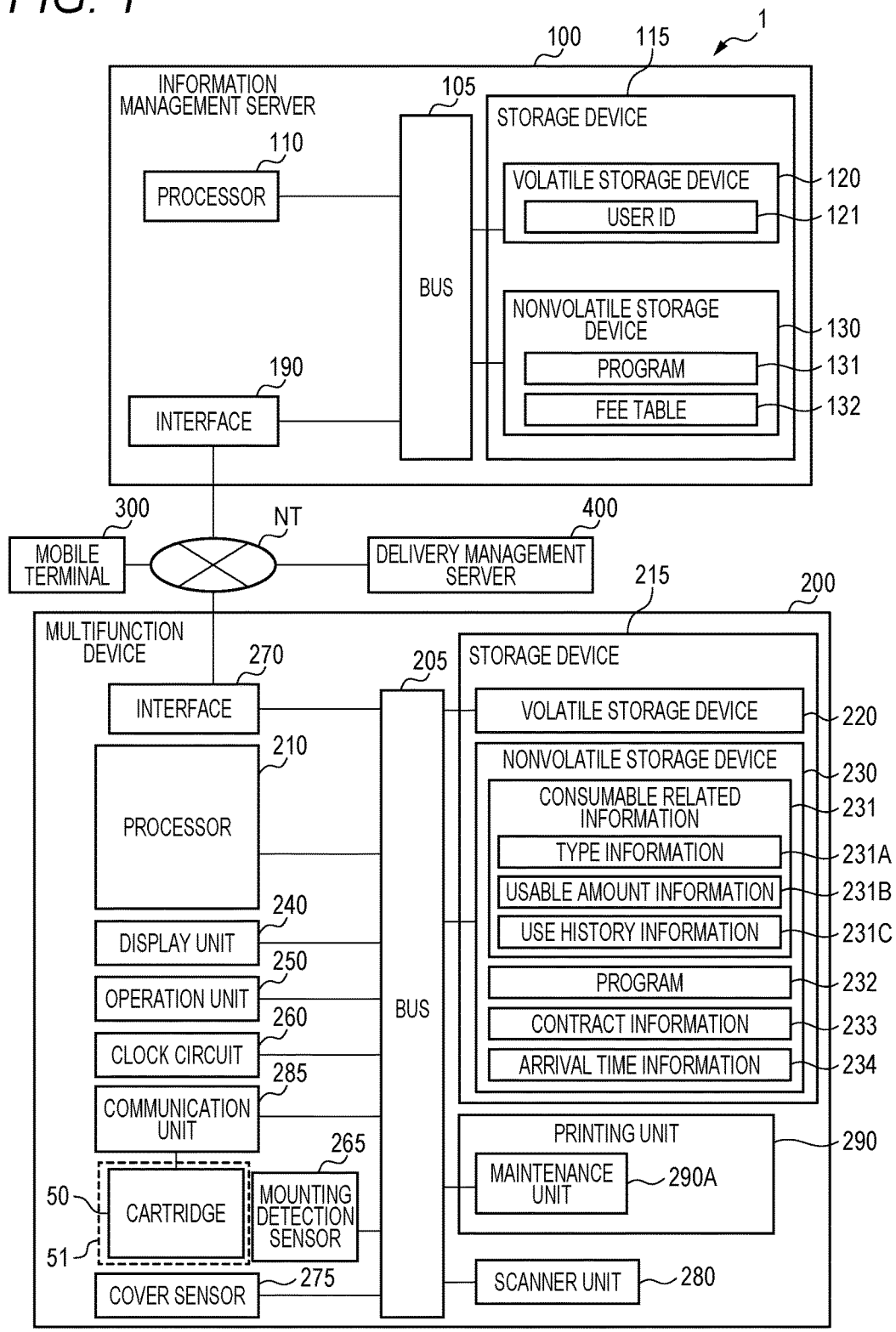
FIG. 1 is a functional block diagram showing an overall schematic configuration of a print processing system according to an embodiment of the present disclosure.

FIG. 1 shows a print processing system according to the first embodiment. The present embodiment is an embodiment of a print processing system 1 capable of providing a delivery service based on a delivery contract for automatically delivering a consumable for replacement when a consumable used in a multifunction device 200 is consumed to a certain extent. The print processing system 1 may also provide a print service based on a print contract for charging a charge amount according to the number of prints in the multifunction device 200.

<Overview of Print Processing System>

In FIG. 1, the print processing system 1 includes an information management server 100, the multifunction device 200, a mobile terminal 300, and a delivery management server 400. The information management server 100, the multifunction device 200, the mobile terminal 300, and the delivery management server 400 are connected to a network NT and may communicate with each other. The multifunction device 200 is an example of a printing apparatus, and the information management server 100 and the mobile terminal 300 are examples of an external device.

<Information Management Server>

The information management server 100 is, for example, a server installed and managed by a manufacturer of the multifunction device 200, and includes a processor 110, a storage device 115, and an interface 190. The processor 110, the storage device 115, and the interface 190 are connected with each other via a bus 105.

The storage device 115 includes a volatile storage device 120 and a nonvolatile storage device 130.

The volatile storage device 120 is, for example, a DRAM, and includes a user ID storage area 121. The nonvolatile storage device 130 is, for example, a hard disk drive or a solid state drive, and includes a program storage area 131 and a fee table storage area 132. The fee table storage area 132 stores, for example, a given correlation for calculating a fee charged to a user in accordance with printing or delivery of an ink cartridge.

The processor 110 is a device that performs data processing, and is, for example, a CPU. The processor 110 executes a program stored in the program storage area 131 to perform various processing shown in FIG. 2 and the like, which will be described later, including data communication with the mobile terminal 300, the multifunction device 200, and the delivery management server 400 connected to the network NT.

The interface 190 is a wired LAN interface or a wireless interface for communicating with other devices, and is connected to the network NT.

<Delivery Management Server>

The delivery management server 400 is installed in, for example, a delivery service company that performs a delivery service of various items, and includes a processor, a storage device, and an interface for connecting to the network NT (not shown).

<Multifunction Device>

The multifunction device 200 is owned by, for example, a business operator that provides the print service. The multifunction device 200 may be personally owned by a user who uses the multifunction device 200. The multifunction device 200 includes a scanner unit 280, a printing unit 290, a processor 210, a storage device 215, a display unit 240, an operation unit 250, a clock circuit 260, a communication unit 285, a mounting detection sensor 265, a communication interface 270, and a cover sensor 275. The scanner unit 280, the printing unit 290, the processor 210, the storage device 215, the display unit 240, the operation unit 250, the clock circuit 260, the communication unit 285, the mounting detection sensor 265, the cover sensor 275, and the communication interface 270 are connected to each other via a bus 205.

The storage device 215 includes a volatile storage device 220 and a nonvolatile storage device 230. The volatile storage device 220 is, for example, a DRAM. The nonvolatile storage device 230 is, for example, a flash memory. The non-volatile storage device 230 includes a consumable related information storage area 231 that stores consumable related information related to an ink cartridge 50, a program storage area 232, a contract information storage area 233 that stores a content of a contract concluded by the user with a contractor, and an arrival time information storage area 234 that stores arrival time information indicating a scheduled arrival date and time at which a contract cartridge 50 is delivered and arrived or an arrival completion date and time at which the contract cartridge 50 has arrived.

The consumable related information storage area 231 includes a type information storage area 231A, a usable amount information storage area 231B, and a use history information storage area 231C. These functions will be described later.

Various programs are stored in the program storage area 232, and the various programs include an operation program of a multifunction device such as a print processing program, the operation program relating to execution of a control method of the printing apparatus of the present embodiment based on sequences and flowcharts of FIGS. 2, 3, 4, 6, 7, and the like to be described later. The print processing program is stored in advance in the program storage area 232 as firmware, for example. Information related to a printing operation based on a contract content to be described later is also stored as a part of the print processing program.

The processor 210 is a device that performs data processing, and is, for example, a CPU. The processor 210 is an example of a controller. The processor 210 executes the print processing program stored in the program storage area 232. Details of processing contents of the processor 210 will be described later.

The display unit 240 is, for example, a liquid crystal display, and may display various kinds of information on consumables as described later. The operation unit 250 is a device that receives an operation by the user. The user may input various instructions to the multifunction device 200 by operating the operation unit 250. The communication interface 270 is a wired or wireless network interface for communicating with other devices, and is connected to the network NT.

The scanner unit 280 optically reads a document as a reading target using a photoelectric conversion element such as a CCD or a CMOS to generate scan data representing a read image.

The printing unit 290 takes out and conveys a sheet in a sheet feeding tray by a conveyance mechanism (not shown), and prints an image on the conveyed sheet by a given method. Hereinafter, a case where printing is performed by an inkjet method will be described as an example. The printing unit 290 forms an image on a sheet using ink of the ink cartridge 50 detachably mounted on a cartridge holder 51 in accordance with a print job transmitted from the mobile terminal 300 or a print job generated by itself based on an operation on the operation unit 250. Specifically, the printing unit 290 includes an inkjet head mounted on a carriage, and performs printing by ejecting ink from the inkjet head while the carriage moves the inkjet head in a main scanning direction. A sheet is an example of a print medium, the ink cartridge 50 is an example of a consumable, and the cartridge holder 51 is an example of a mounting unit. Specifically, the ink cartridge 50 for each of ink colors of cyan ink, magenta ink, yellow ink, and black ink is included, but hereinafter, for the sake of convenience, unless otherwise specified, the ink cartridge 50 for each of ink colors will be simply referred to as the "ink cartridges 50" without being distinguished from each other.

The printing unit 290 includes a maintenance unit 290A. The maintenance unit 290A includes a cap and a suction pump. The multifunction device 200 operates the maintenance unit 290A to perform flushing or purging. Specifically, the flushing is processing of ejecting ink from a plurality of nozzles provided in the inkjet head and discharging thickened ink in the nozzles in a state where the carriage is positioned at a given flushing position before printing on a sheet, and the purging is processing of driving the suction pump by connecting the suction pump to a nozzle covered with the cap and sucking and discharging ink in a flow path of the inkjet head from the nozzle. That is, the maintenance unit 290A performs some maintenance processing for restoring a function of the nozzles of the inkjet head, and the ink is always consumed when the maintenance processing is performed.

In the present embodiment, the processor 210 of the multifunction device 200 automatically executes the maintenance processing when a given maintenance execution condition is satisfied in an automatic maintenance mode. As an example, when the processor 210 determines a degree of thickening of the ink in a nozzle 10 by an appropriate method, for example, every given cycle, for example, every half a month, and determines that maintenance is necessary, the maintenance processing including the flushing operation or the purging operation is executed.

The mounting detection sensor 265 is, for example, a connector that conducts with an electrode of the ink cartridge 50 when the ink cartridge 50 is mounted on the cartridge holder 51. The processor 210 may identify whether the ink cartridge 50 is mounted on the cartridge holder 51 based on a detection result of the mounting detection sensor 265.

The communication unit 285 is, for example, a terminal, and is electrically connected to a cartridge memory (IC chip) of the ink cartridge 50 mounted on the cartridge holder 51. That is, as described above, the multifunction device 200 of the present embodiment is a model that may be used in a delivery service based on a given delivery contract, and is also a model that may be used in a print service based on a given print contract. The ink cartridge 50 (hereinafter, appropriately referred to simply as the "contract cartridge 50") used based on such a contract has a specification different from, for example, a normal ink cartridge 50 (hereinafter, appropriately referred to simply as a "normal cartridge 50"), which is a commercial product purchased and used by an owner of the multifunction device 200. The contract cartridge 50 is an example of a first consumable, and the normal cartridge 50 is an example of a second consumable. The ink cartridge 50 based on an imitation obtained by imitating the normal cartridge 50 in an unauthorized manner, is also an example of the second consumable.

As a type of the ink cartridge 50, a dual functional ink cartridge 50 having both a function of the contract cartridge 50 and a function of the normal cartridge 50 may be used. The dual functional ink cartridge 50 functions as the contract cartridge 50 when a service based on a contract is provided, and functions as the normal cartridge 50 when the service based on the contract is not provided. Therefore, the dual functional ink cartridge 50 may be treated as the contract cartridge 50 when the service based on the contract is provided, and in this case, the dual functional ink cartridge 50 is an example of the first consumable. On the other hand, when the service based on the contract is not provided, the dual functional ink cartridge 50 may be treated as the normal cartridge 50, and thus, the dual functional ink cartridge 50 is an example of the second consumable.

The ink cartridge 50 is provided with a cartridge memory (not shown), and cartridge information is stored in the cartridge memory. The cartridge information includes, for example, cartridge type information indicating whether the ink cartridge 50 is the contract cartridge 50 or the normal cartridge 50, a model number, identification information unique to the ink cartridge 50, that is, a cartridge ID, and the like. The processor 210 acquires the cartridge information from the cartridge memory of the ink cartridge 50 connected by the communication unit 285. Hereinafter, "acquisition" processing by the processor 210 in the present specification represents, for example, processing of reading information on a nonvolatile storage area into a volatile storage area such as a DRAM. Accordingly, the processor 210 may identify whether the ink cartridge 50 mounted on the cartridge holder 51 is the contract cartridge 50 or the normal cartridge 50 based on the acquired information. An identification result, that is, type information on the cartridge 50 is associated with the cartridge ID and the model number by the processor 210 and is stored in the type information storage area 231A of the consumable related information storage area 231 at any time.

The cartridge holder 51 is provided with an opening-closing cover (not shown) that is openable and closable. When the ink cartridge 50 is mounted on or detached from the cartridge holder 51, the opening-closing cover is opened, and after the ink cartridge 50 is mounted on or detached from the cartridge holder 51, the opening-closing cover is closed. An open state and a closed state of the opening-closing cover are detected with the cover sensor 275 by a known method, and a corresponding detection signal is input to the processor 210.

The processor 210 may identify whether the ink cartridge 50 is mounted on the cartridge holder 51 based on a detection result by the cover sensor 275 instead of the mounting detection sensor 265.

At this time, in the multifunction device 200, a remaining amount of ink or a usage amount of ink in the ink cartridge 50 mounted on the cartridge holder 51 is acquired at any time by a known method by the processing of the processor 210. When the remaining amount of ink decreases and reaches a given remaining amount threshold value, or when the usage amount of ink increases and reaches a given usage amount threshold value, it is possible to display on the display unit 240 that the ink cartridge 50 is to be replaced. This makes it easier for the user to replace the ink cartridge 50.

Hereinafter, the remaining amount of ink and the usage amount of ink are collectively referred to as a "usable amount", and information indicating the remaining amount of ink and the usage amount of ink is referred to as "usable amount information". The usable amount information acquired as described above may be written to the cartridge memory by the communication unit 285 and included in the cartridge information in the cartridge memory. In this case, the processor 210 may identify the usable amount of the ink cartridge 50 based on the cartridge information acquired via the communication unit 285 when the ink cartridge 50 is mounted on the cartridge holder 51. An identification result, that is, the usable amount information of the ink cartridge 50 is associated with the cartridge ID and the model number by the processor 210 and is stored in the usable amount information storage area 231B of the consumable related information storage area 231 at any time.

When the remaining amount of ink or the usage amount of ink of the ink cartridge 50 mounted on the cartridge holder 51, that is, the usable amount information is acquired at any time as described above, the processor 210 stores history thereof in the use history information storage area 231C as use history information.

The clock circuit 260 is, for example, a circuit such as a real time clock (RTC), and has a function as an internal clock that measures time. The clock circuit 260 is driven by driving power supplied from a power supply circuit (not shown), and current time information to be measured may be referenced by the processor 210 at any time. Note that the processor 210 may acquire the current time information from a simple network time protocol (SNTP) server (not shown) on the network NT via the communication interface 270 instead of the clock circuit 260.

Alternatively, the current time information measured by the clock circuit 260 may be appropriately calibrated based on time information from the SNTP server or time information acquired from the mobile terminal 300. In particular, in a case where the driving power is not supplied from the power supply circuit due to a power supply of the multifunction device 200 being turned off or the like, the current time information in the clock circuit 260 may be calibrated at any time based on the time information from the SNTP server or the like. Further, in such a case, the time information from the SNTP server or the information management server 100 may be forcibly injected into the clock circuit 260 and used as the current time information.

<Mobile Terminal>

The mobile terminal 300 is a mobile terminal such as a smartphone owned by a user, and is connected to the network NT via wireless communication. The mobile terminal 300 includes a processor, a storage device, an interface for connecting to the network NT, and an appropriate display device (not shown). Various programs are stored in a program storage area provided in the storage device, and the various programs include a processing program related to execution of a sequence flow of FIG. 2 to be described later. Instead of the mobile terminal 300, the other information terminal such as a personal computer or a tablet computer may be used. Hereinafter, these information terminals are collectively and simply referred to as the "mobile terminal 300" as appropriate.

FEATURES OF EMBODIMENT

In the above configuration, a feature of the present embodiment is to perform appropriate control for the execution of the maintenance processing in accordance with a delivery status of the ink cartridge 50 after the delivery contract is concluded.

That is, after the delivery contract is concluded, the contract cartridge 50 is delivered from a given delivery source to the user under the management by the delivery management server 400. However, depending on a usage situation or a circumstance of the user, the cartridge 50 currently mounted on the cartridge holder 51 may be used up before the delivery arrives. The cartridge 50 being mounted on the cartridge holder 51 is an example of a currently mounted consumable.

In a case where the commercially available normal cartridge 50 is mounted and used, when the normal cartridge 50 is used up, a new normal cartridge 50 may be purchased. However, when the delivered contract cartridge 50 arrives, the newly purchased normal cartridge 50 is unnecessary, and thus a purchase cost is wasted. Therefore, it is desirable to extend a life of a currently mounted normal cartridge 50 as long as possible until the contract cartridge 50 arrives.

On the other hand, for example, in a case where the contract cartridge 50 based on a past contract is mounted on the cartridge holder 51 and used, when the contract cartridge 50 is used up, the other contract cartridge 50 may be newly mounted. In this case, even if a new contract cartridge 50 that has been delivered arrives and the other contract cartridge 50 is replaced with the arrived contract cartridge 50, a cost of the detached contract cartridge 50 itself is not originally borne by the user, and thus there is no particular cost waste. As for a user's psychology, there is a need to replace the other contract cartridge 50 with the new contract cartridge 50 even if the other contract cartridge 50 has a sufficient remaining life when the delivered contract cartridge 50 arrives within a relatively short period of time after the other contract cartridge 50 is mounted. However, when the other contract cartridge 50 cannot be prepared, it is desirable to extend a life of a currently mounted contract cartridge 50 as long as possible until the delivered contract cartridge 50 arrives.

On the other hand, as described above, ink in the cartridge 50 is consumed during the execution of the maintenance processing. When the maintenance processing is automatically executed in the above automatic maintenance mode, the ink is automatically consumed, and the cartridge 50 is consumed. Therefore, from a viewpoint of extending the life of the cartridge 50 as described above, some contrivance is required for the execution of the maintenance processing.

<Flow of Processing>

In accordance with the above description, processing executed in the print processing system 1 and the multifunction device 200 according to the present embodiment will be described below in order with reference to FIGS. 2 to 7.

<Schematic Processing of Entire System at the Time of Contract Conclusion>

Figure 2:
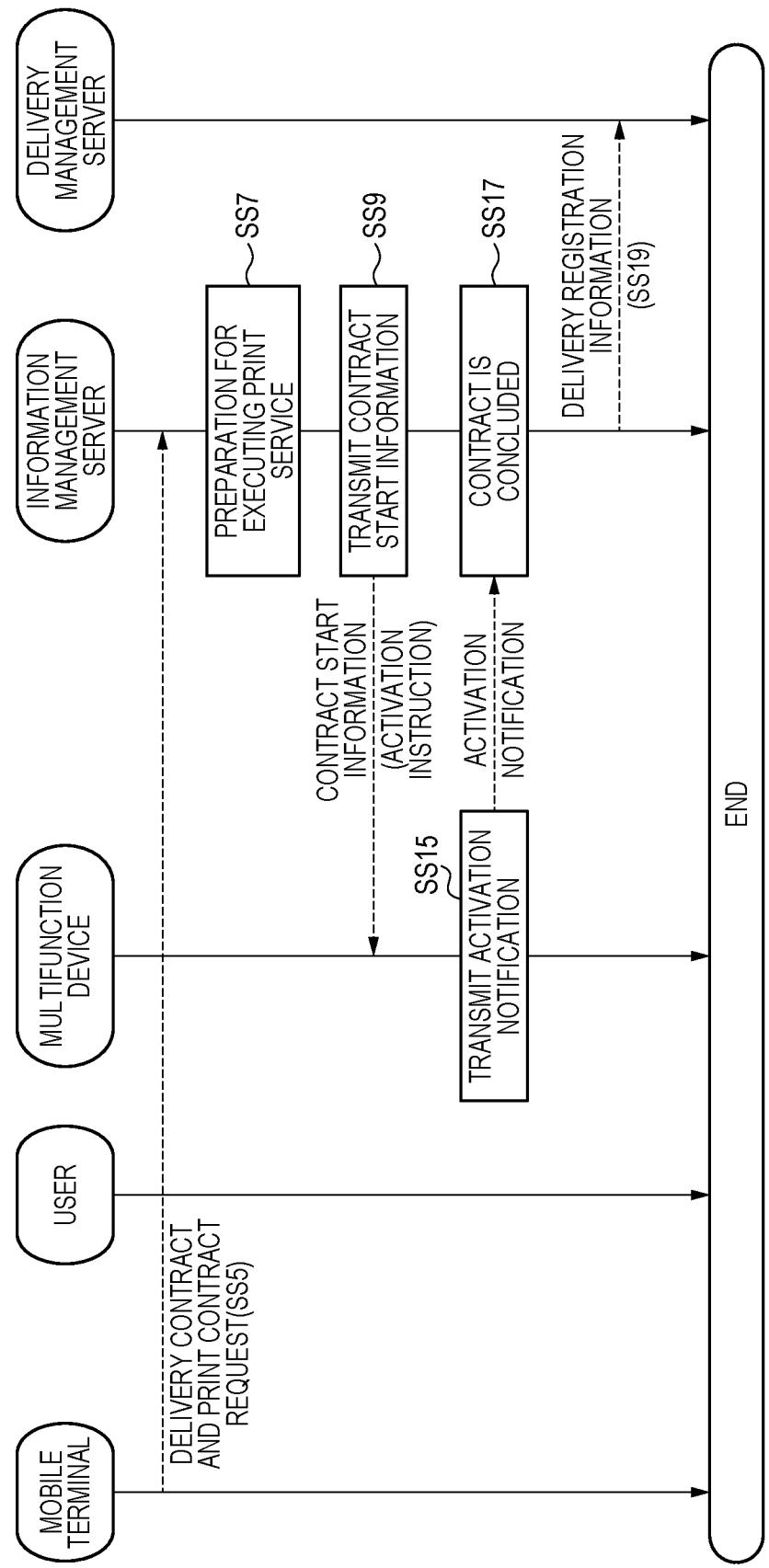
FIG. 2 is a sequence flow showing contract conclusion processing executed by a mobile terminal, a multifunction device, an information management server, and a delivery server.

First, processing when concluding a delivery contract, which is executed by the processor 210 of the multifunction device 200, the processor 110 of the information management server 100, the processor of the delivery management server 400, and the processor of the mobile terminal 300, will be described with reference to the sequence flow of FIG. 2. In the description of FIG. 2, the description of each processor is omitted as appropriate, and "in the processor of the multifunction device 200", "by the processor of the multifunction device 200", and the like are simply described as "in the multifunction device 200", "by the multifunction device 200", and the like.

In FIG. 2, first, the user performs an appropriate operation on the mobile terminal 300 with an intention of using the multifunction device 200 based on the delivery contract and the print contract described above, and thus a delivery contract and print contract request is transmitted from the mobile terminal 300 to the information management server 100 and is received by the information management server 100 (SS5).

In response to this, the information management server 100 performs a given preparation for executing a print service based on the print contract, for example, a preparation for counting the number of print pages (SS7).

Thereafter, contract start information, that is, an Activation instruction is transmitted from the information management server 100, and is received by the multifunction device 200 (SS9). Accordingly, both the delivery contract and the print contract described above are established. The multifunction device 200 writes the fact that the multifunction device 200 itself has shifted to a contract start state based on reception of the Activation instruction into the contract information storage area 233 as contract information, for example, in a form of a flag. Since the Activation is performed, the multifunction device 200 may perform a printing operation based on a conclusion content of a contract.

The printing operation of the multifunction device based on presence or absence of the flag at this time is an example of an "operation based on the conclusion content of the contract". As the "operation based on the conclusion content of the contract", the processor 210 of the multifunction device 200 may perform processing of accessing various kinds of information including the type information and the usable amount information stored in the consumable related information storage area 231 of the storage device 215 according to the presence or absence of the flag and displaying the information on the display unit 240.

Thereafter, a contract approval notification, that is, an Activation notification is transmitted from the multifunction device 200 (SS15), and is received by the information management server 100 (SS17). Note that an inquiry may be made from the information management server 100, and the Activation notification may be transmitted as a response from the multifunction device 200 in response to the inquiry. Accordingly, the information management server 100 recognizes that the above print contract has been concluded. Thereafter, the multifunction device 200 performs communication for periodically exchanging information on a contract with the information management server 100.

Thereafter, delivery registration information for delivering the contract cartridge 50 to the user is transmitted from the information management server 100 to the delivery management server 400 (SS19). Accordingly, registration arrangement for delivering the contract cartridge 50 from a company that provides the delivery service to the user is completed.

<Processing of Processor at the Time of Contract Conclusion—Part 1>

Figure 3:
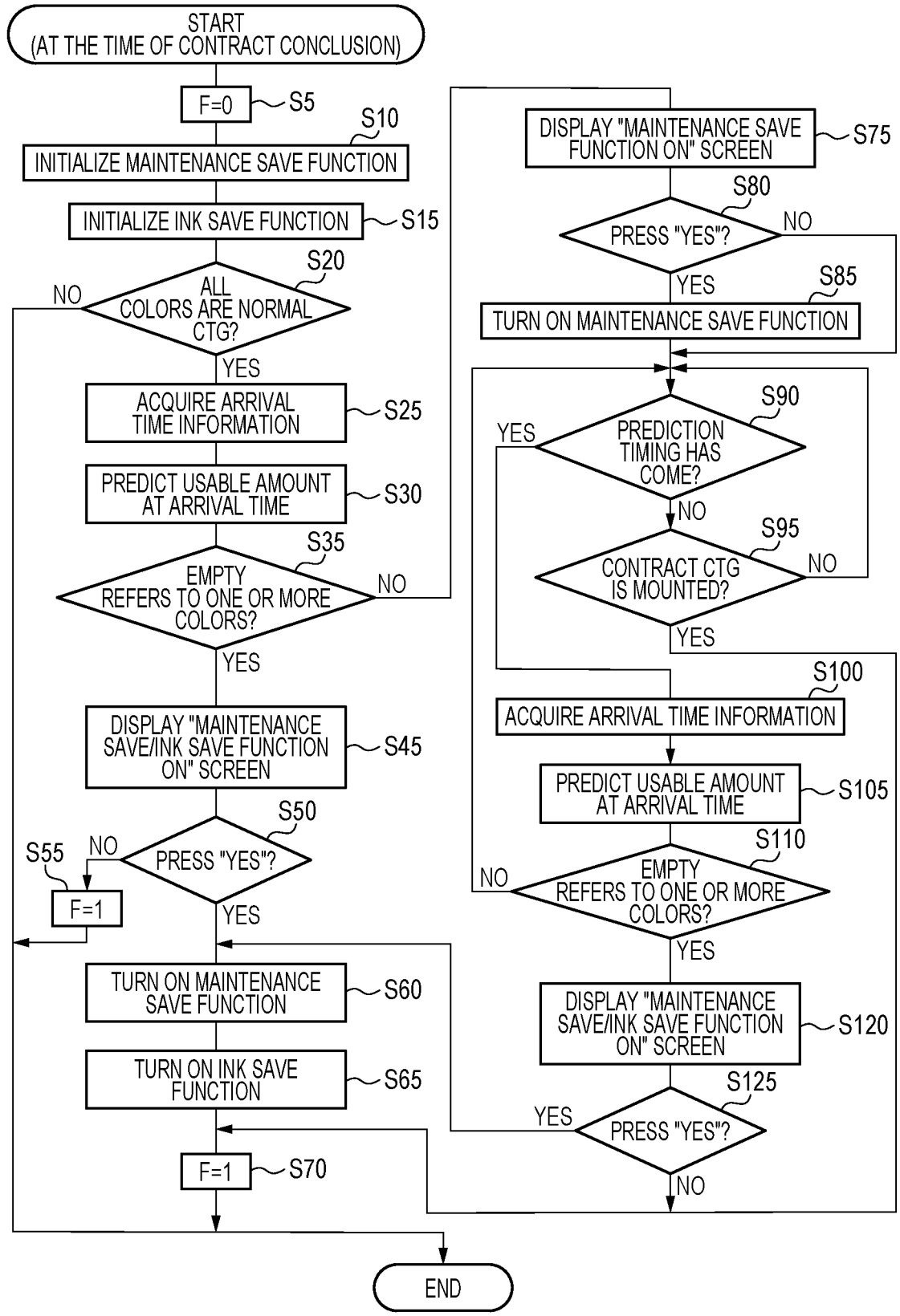
FIG. 3 is a flowchart showing processing executed by a processor of the multifunction device when a contract is concluded.

FIG. 3 shows processing executed independently by the processor 210 of the multifunction device 200 when the contract is concluded as described above. In FIG. 3, first, in S5, a flag F representing display history of a "maintenance save function ON/ink save function ON" screen, which will be described in detail later, is initialized to 0.

In S10, a maintenance save function is initialized to an OFF state. From the viewpoint of extending the life of the cartridge 50, the maintenance save function is a function of preventing consumption of the cartridge 50 due to consumption of ink by automatic execution of the maintenance processing. Details of the maintenance save function will be described later.

In S15, an ink save function is initialized to an OFF state. From the viewpoint of extending the life of the cartridge 50, the ink save function is a function of preventing consumption of the cartridge 50 due to the printing unit 290 executing printing and consuming ink. Details of the ink save function will be described later.

In S20, it is determined whether all of the ink cartridges 50 of the cyan ink, the magenta ink, the yellow ink, and the black ink are the normal cartridges 50 based on a storage result of the type information storage area 231A at this time. If there is at least one contract cartridge 50 among these four cartridges 50, it is determined No, and the flow is ended. If all of the four cartridges 50 are the normal cartridges 50, it is determined Yes, and the process proceeds to S25. The processing executed by the processor 210 in S20 is an example of determination processing.

In S25, arrival time information of the contract cartridge 50 stored in the arrival time information storage area 234 at this time is read and acquired. When the contract cartridge 50 based on the delivery contract has already arrived at the user, arrival time information indicating an arrival date and time and information indicating "arrived" are acquired, and when the contract cartridge 50 has not arrived yet after shipment and is being delivered or has not yet been shipped, arrival time information indicating a scheduled arrival date and time is acquired. S25 is an example of an acquisition step, and the processing executed by the processor 210 in S25 is an example of acquisition processing.

<Arrival Information Storage Processing>

Storage of the arrival time information in the arrival time information storage area 234 is performed by the processor 210. A flow of processing executed at this time will be described with reference to FIG. 4. The flow of FIG. 3 and the flow of FIG. 4 are simultaneously executed in parallel by a known method similar to "multitask processing", which is often performed by, for example, an OS of a computer.

Figure 4:
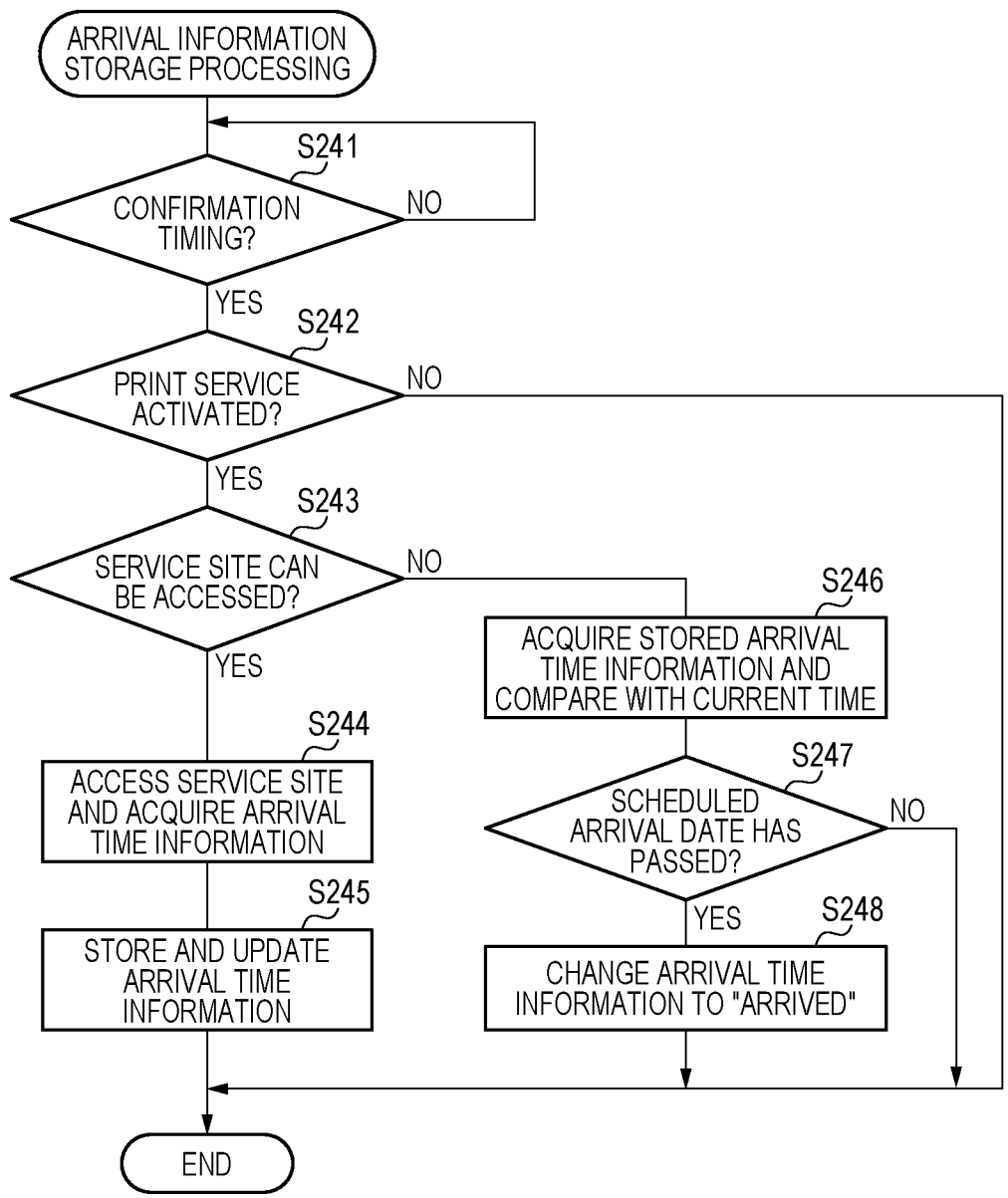
FIG. 4 is a flow showing processing performed by the processor of the multifunction device when arrival time information is stored in an arrival time information storage area.

In FIG. 4, first, in S241, it is determined whether a given confirmation timing has arrived. That is, the current time indicated by the current time information by the clock circuit 260 is compared with the given confirmation timing, and it is determined whether the current time is the same as the confirmation timing or whether the current time has passed the confirmation timing. Examples of the confirmation timing include a power-on timing of the multifunction device 200, an opening operation timing of the opening-closing cover detected by the cover sensor 275, and a completion timing of the print job by the printing unit 290. Alternatively, a date and time when confirmation should be periodically executed may be individually set as the confirmation timing in advance, or the confirmation timing may be set so that the confirmation is executed at given periods.

If the current time is the same as the confirmation timing or if the current time has passed the confirmation timing, it is determined Yes in S241, and it is determined whether the multifunction device 200 is in the contract start state (Activate) by the contract conclusion described above with reference to FIG. 2 (S242). If Activate is not reached, it is determined No, and the flow is ended. If Activate is reached, it is determined Yes, and it is determined whether a service site of the delivery service company provided by the delivery management server 400 may be accessed (S243).

It is determined Yes if the service site may be accessed, and the arrival time information of the corresponding contract cartridge 50 is acquired by accessing the service site (S244). By the access at this time, the processor 210 may acquire information from the service site through the delivery management server 400 via the network NT, or the processor 210 may directly acquire information from the service site based on a URL. Thereafter, the arrival time information acquired in S244 is stored in the arrival time information storage area 234, so that a content of the arrival time information stored in the arrival time information storage area 234 is updated (S245), and the flow is ended.

On the other hand, it is determined No if the service site cannot be accessed in S243, latest arrival time information stored in the arrival time information storage area 234 at this time is acquired, and is compared with the current time indicated by the current time information by the clock circuit 260 (S246). If the current time has not passed a scheduled arrival date indicated by the arrival time information, it is determined No in S247, and the flow is ended. It is determined Yes in S247 if the current time has passed the scheduled arrival date, the content of the arrival time information stored in the arrival time information storage area 234 is changed to "arrived" (S248), and the flow is ended.

<Processing of Processor at the Time of Contract Conclusion—Part 2>

Returning to FIG. 3, in S30, a usable amount of the ink cartridge 50 when the arrival time arrives is predicted for each ink color based on the arrival time information acquired in S25 and the use history information stored in the use history information storage area 231C. The processing executed by the processor 210 in S30 is an example of first processing and is also an example of prediction processing.

In S35, it is determined whether the predicted usable amount of the ink cartridge 50 of at least one of the ink colors reaches a given threshold value corresponding to an Empty state, which is an ink remaining amount deficiency state, in a prediction result of S30. The processing executed by the processor 210 in S35 is an example of first determination processing. If there is no ink cartridge 50 that reaches the threshold value, it is determined No, and the process proceeds to S75 to be described later. If there is at least one ink cartridge 50 that reaches the threshold value, it is determined Yes, and the process proceeds to S45.

In S45, a "maintenance save function ON/ink save function ON" screen 240A for confirming to the user whether to execute both the maintenance save function and the ink save function is displayed on the display unit 240. The screen 240A is an example of a first confirmation screen, and the processing executed by the processor 210 in S45 is an example of first display processing.

Figure 5A:
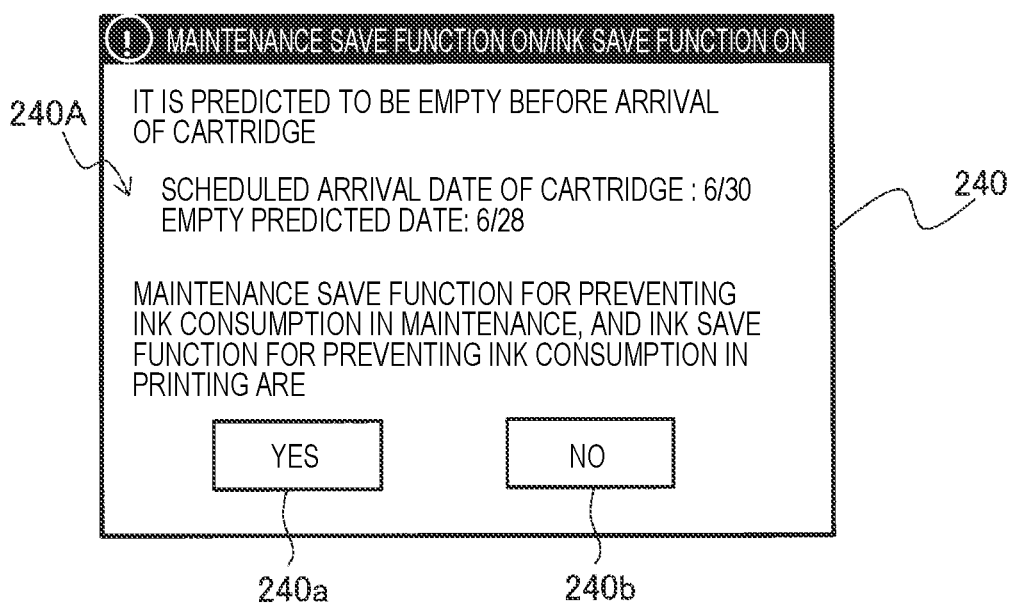
FIGS. 5A and 5B are explanatory diagrams showing display examples of a "maintenance save function ON/ink save function ON" screen and a "maintenance save function ON" screen on a display unit of the multifunction device.

FIG. 5A shows a specific example of the "maintenance save function ON/ink save function ON" screen 240A. As shown in the figure, on the screen 240A, a message that "it is predicted to be Empty before arrival of the cartridge" and a message that "a maintenance save function for preventing ink consumption in automatic maintenance, and an ink save function for preventing ink consumption in printing are turned ON?" is displayed. In correspondence to an acquisition result in S25, the scheduled arrival date of the delivered contract cartridge 50 is displayed as June 30 in this example, and in correspondence to the prediction result in S30, a date expected to reach the threshold value corresponding to Empty is displayed as June 28 in this example. According to a display content, a "Yes" button 240a indicating that the user approves the maintenance save function ON/ink save function ON and a "No" button 240b indicating that the user disapproves the maintenance save function ON/ink save function ON are provided. These buttons 240a and 240b are an example of an input unit. Instead of providing the input unit in the screen of the display unit 240 as described above, the input unit may be provided as a physical button in the operation unit 250, for example.

Returning to FIG. 3, in S50, it is determined whether the "Yes" button 240a is pressed on the screen 240A. If the "Yes" button 240a is operated, it is determined Yes, and the process proceeds to S60 to be described later. If the "No" button 240b is operated, it is determined No, and the flow is ended after setting the flag F=1 in S55. In this case, S60 to be described later is not executed, that is, a state in which the maintenance save function is executed is not decided as a transition destination, and thus, in other words, a state in which the maintenance save function is not executed is decided as a transition destination.

In S60, the maintenance save function is turned ON, that is, the state in which the maintenance save function is executed is decided as a transition destination. The processing executed by the processor 210 in S60 is an example of decision processing. There are two modes of execution of the maintenance save function: first save processing of delaying a timing of performing the maintenance processing by the maintenance unit 290A; and second save processing of reducing a processing strength when performing the maintenance processing by the maintenance unit 290A.

(i) First Save Processing

The first save processing is processing of executing the maintenance processing at a timing after the arrival timing represented by the arrival time information acquired in S25 and the like. As an example, the first save processing is processing such as not executing the maintenance processing even when the timing at which the automatic maintenance processing is executed comes while the current cartridge 50 is mounted on the cartridge holder 51, and executing the maintenance processing at the timing at which the new contract cartridge 50 that has been delivered is mounted.

(ii) Second Save Processing

The second save processing is processing of reducing the strength of the maintenance processing executed by the maintenance unit 290A. For example, in a case of flushing, when the ink is ejected from the nozzles in order to discharge the thickened ink in the nozzles, an ejection pressure, an ejection amount, an ejection speed, or the like is reduced. In a case of purging, when the suction pump is driven to suck the ink in the flow path of the inkjet head, a suction pressure of the suction pump, a pump rotation speed, or the like is reduced.

In S65, the ink save function is turned ON, that is, the state in which the ink save function is executed is decided as a transition destination. As a mode of executing the ink save function, various known methods capable of preventing consumption of ink at the time of printing may be applied. For example, the methods include processing of reducing an ink consumption amount, such as reducing a print density, roughening a dot density, lowering coverage, or lowering print quality.

In S70, the flag F=1 is set, and the flow is ended.

In S75 after S35 is determined No, a "maintenance save function ON" screen 240B for confirming to the user whether to execute the maintenance save function is displayed on the display unit 240. The screen 240B is an example of a second confirmation screen, and the processing executed by the processor 210 in S75 is an example of second display processing.

Figure 5B:
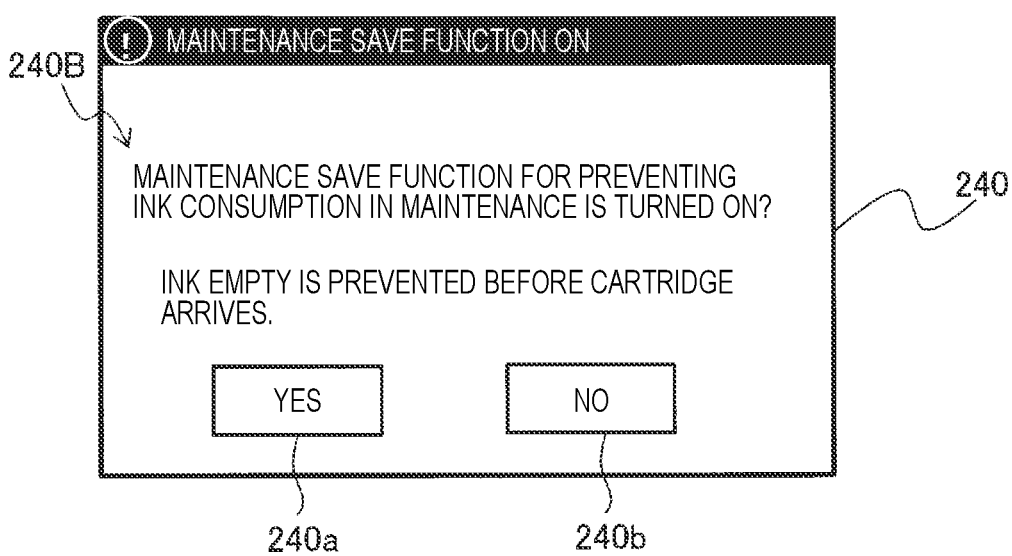

A specific example of the "maintenance save function ON" screen 240B is shown in FIG. 5B. As shown in the figure, on the screen 240B, a message that "a maintenance save function for preventing ink consumption in automatic maintenance is turned ON?" is displayed. Further, according to a display content, a "Yes" button 240a indicating that the user approves the maintenance save function ON/ink save function ON and a "No" button 240b indicating that the user disapproves the maintenance save function ON/ink save function ON are provided. These buttons 240a and 240b are an example of the input unit.

Returning to FIG. 3, in S80, as in S50, it is determined whether the "Yes" button 240a is pressed on the screen 240B. If the "No" button 240b is operated, it is determined No, and the process proceeds to S90 to be described later. In this case, S85 to be described later is not executed, that is, a state in which the maintenance save function is executed is not decided as a transition destination, and thus, in other words, a state in which the maintenance save function is not executed is decided as a transition destination. If the "Yes" button 240a is operated, it is determined Yes, and the process proceeds to S85.

In S85, as in S60, the maintenance save function is turned ON, that is, the state in which the maintenance save function is executed is decided as a transition destination. The processing executed by the processor 210 in S85 is also an example of the decision processing.

In S90, it is determined whether a given timing at which a new prediction is performed has come. The given timing is a timing that comes periodically, for example, once a day or every time printing is performed. If the given timing has arrived, it is determined Yes, and the process proceeds to S100 to be described later. If the given timing has not arrived, it is determined No, and the process proceeds to S95.

In S95, the cartridge type information of the ink cartridge 50 being mounted on the cartridge holder 51 is acquired via the communication unit 285, and it is determined whether the contract cartridge 50 is mounted. If the contract cartridge 50 is mounted, it is determined Yes, and the process proceeds to S70 described above. If the normal cartridge 50 is mounted, it is determined No, and the process returns to S90 and the same processing is repeated.

In S100, as in S25, the arrival time information of the contract cartridge 50 is acquired from the arrival time information storage area 234. When the contract cartridge 50 has already arrived, arrival time information and information indicating "arrived" are acquired, and when the contract cartridge 50 has not arrived yet and is being delivered or has not yet been shipped, arrival time information indicating a scheduled arrival date and time is acquired. S100 is also an example of the acquisition step, and the processing executed by the processor 210 in S100 is also an example of the acquisition processing.

In S105, as in S30, a usable amount of the ink cartridge 50 when the arrival time arrives is predicted for each ink color based on the arrival time information acquired in S100 and the use history information stored in the use history information storage area 231C. The processing executed by the processor 210 in S105 is an example of second processing and is also an example of the prediction processing.

In S110, as in S35, it is determined whether the predicted usable amount of the ink cartridge 50 of at least one of the ink colors reaches a given threshold value corresponding to an Empty state in a prediction result of S105. The processing executed by the processor 210 in S110 is an example of second determination processing. If there is no ink cartridge 50 that reaches the threshold value, it is determined No, and the process returns to S90 described above, and the same procedure is repeated. If there is at least one ink cartridge 50 that reaches the threshold value, it is determined Yes, and the process proceeds to S120.

In S120, as in S45 described above, the "maintenance save function ON/ink save function ON" screen 240A is displayed on the display unit 240. The screen 240A in this case is an example of a third confirmation screen, and the processing executed by the processor 210 in S120 is an example of third display processing.

In S125, it is determined whether the "Yes" button 240a is pressed on the screen 240A displayed in S120. If the "Yes" button 240a is operated, it is determined Yes, the process proceeds to S60 described above, and the state in which the maintenance save function is executed is decided as a transition destination. If the "No" button 240b is operated, it is determined No, and the process proceeds to S70 described above. In this case, S60 is not executed, that is the state in which the maintenance save function is executed is not decided as a transition destination, and thus, in other words, the state in which the maintenance save function is not executed is decided as a transition destination.

<Processing of Processor when Contract Cartridge is Mounted>

Figure 6:
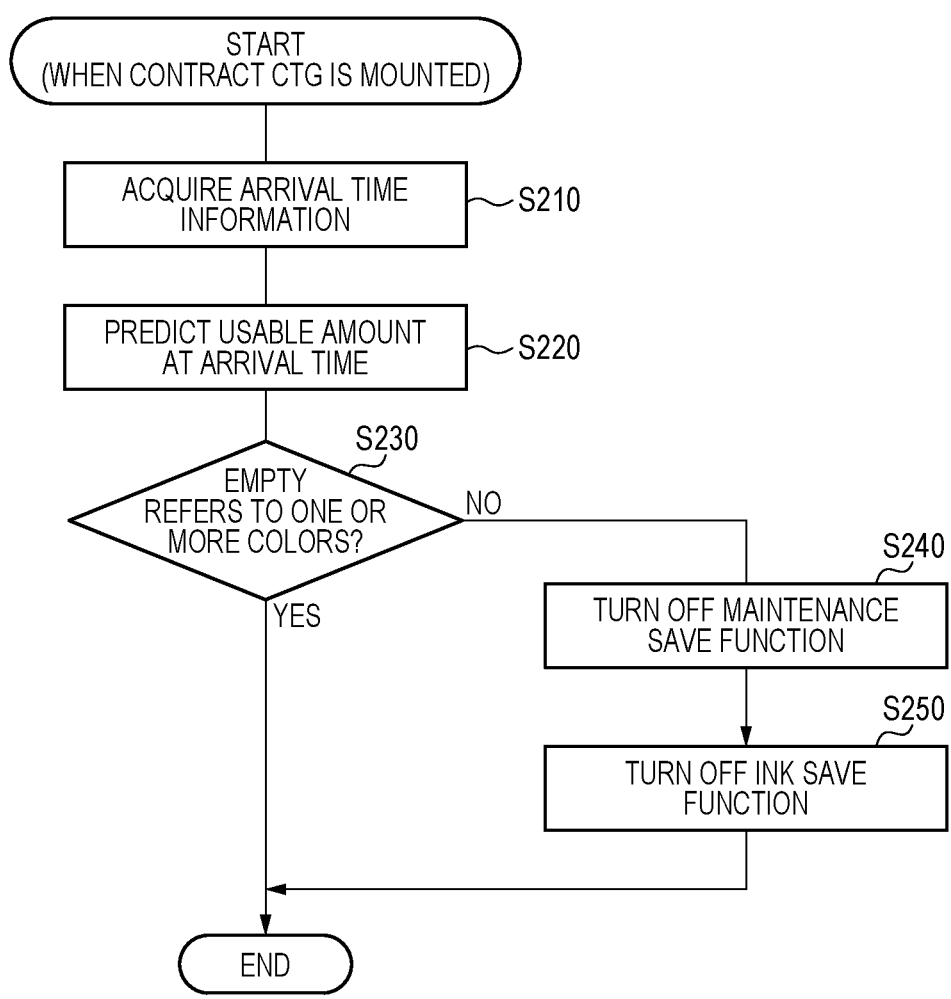
FIG. 6 is a flowchart showing processing executed by the processor of the multifunction device when a contract cartridge is mounted after a contract is concluded.

FIG. 6 shows processing executed by the processor 210 of the multifunction device 200 when the contract cartridge 50 is mounted after a contract is concluded. In FIG. 6, first, in S210, the arrival time information of the contract cartridge 50 is acquired from the arrival time information storage area 234, as in S25 and S100. When the contract cartridge 50 has already arrived, arrival time information and information indicating "arrived" are acquired, and when the contract cartridge 50 has not arrived yet and is being delivered or has not yet been shipped, arrival time information indicating a scheduled arrival date and time is acquired. S210 is also an example of the acquisition step, and the processing executed by the processor 210 in S210 is also an example of the acquisition processing.

In S220, as in S30 and S105, a usable amount of the ink cartridge 50 when the arrival time arrives is predicted for each ink color based on the arrival time information acquired in S210 and the use history information stored in the use history information storage area 231C. The processing executed by the processor 210 in S220 is also an example of the prediction processing.

In S230, as in S35 and S110, it is determined whether the predicted usable amount of the ink cartridge 50 of at least one of the ink colors reaches a given threshold value corresponding to an Empty state in a prediction result of S220. If there is at least one ink cartridge 50 that reaches the threshold value, it is determined Yes, and the flow is ended. If there is no ink cartridge 50 that reaches the threshold value, it is determined No, and the process proceeds to S240.

In S240, the maintenance save function is turned OFF, that is, the state in which the maintenance save function is not executed is decided as a transition destination. The processing executed by the processor 210 in S240 is also an example of the decision processing.

In S250, the ink save function is turned OFF, that is, the state in which the ink save function is not executed is decided as a transition destination, and the flow is ended.

<Processing of Processor after Contract Cartridge is Mounted>

Figure 7:
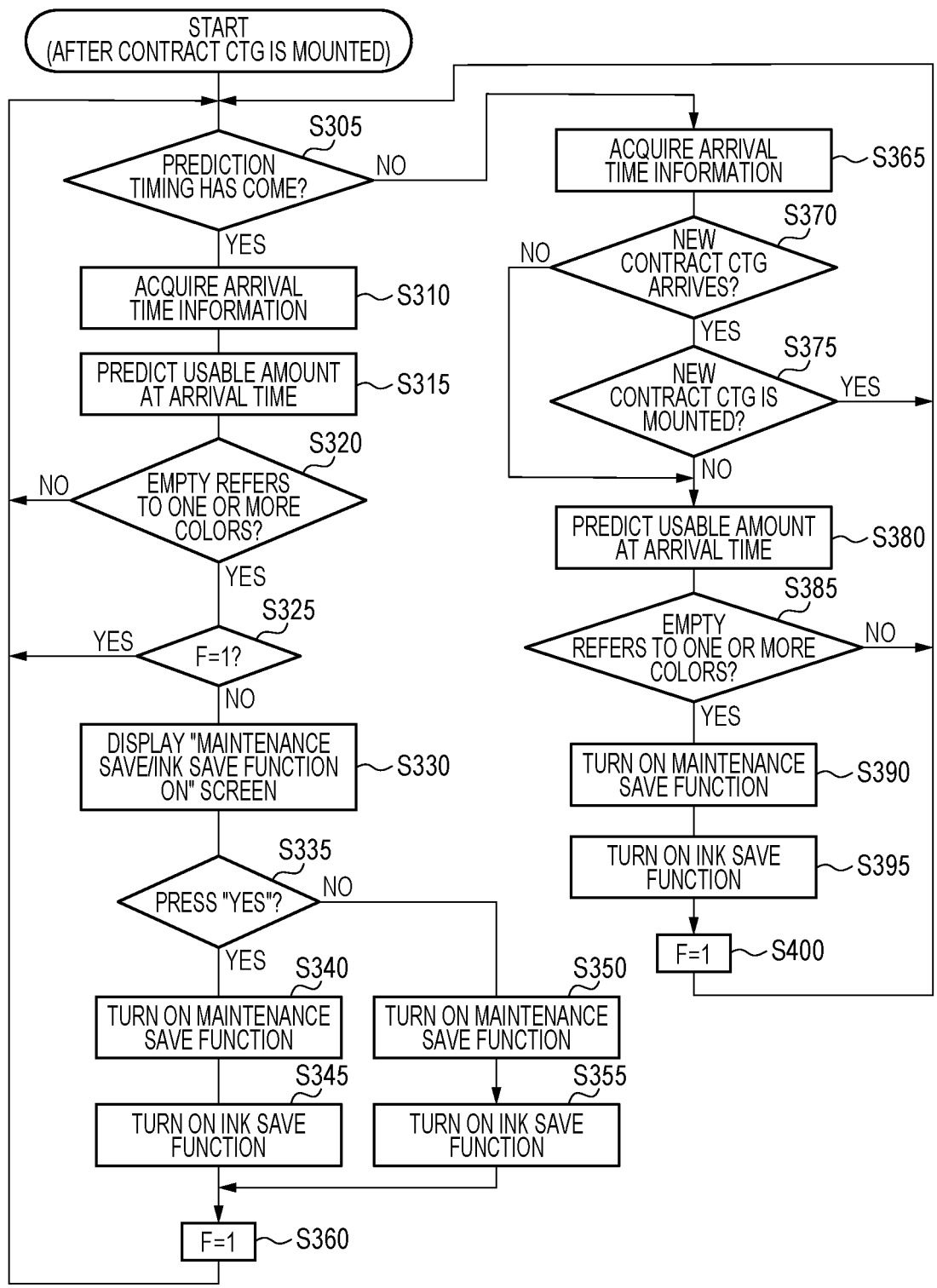
FIG. 7 is a flowchart showing processing executed by the processor of the multifunction device after the contract cartridge is mounted.

FIG. 7 shows processing executed by the processor 210 of the multifunction device 200 after the contract cartridge 50 is mounted. In FIG. 7, first, in S305, as in S90, it is determined whether a given timing at which a new prediction is performed has come. If the given timing has not arrived, it is determined No, and the process proceeds to S365 to be described later. If the given timing has arrived, it is determined Yes, and the process proceeds to S310.

In S310, as in S25 and S100, the arrival time information of the contract cartridge 50 is acquired from the arrival time information storage area 234. When the contract cartridge 50 has already arrived, arrival time information and information indicating "arrived" are acquired, and when the contract cartridge 50 has not arrived yet and is being delivered or has not yet been shipped, arrival time information indicating a scheduled arrival date and time is acquired. S310 is also an example of the acquisition step, and the processing executed by the processor 210 in S310 is also an example of the acquisition processing.

In S315, as in S30 and S105, a usable amount of the ink cartridge 50 when the arrival time arrives is predicted for each ink color based on the arrival time information acquired in S310 and the use history information stored in the use history information storage area 231C. The processing executed by the processor 210 in S315 is an example of third processing and is also an example of the prediction processing.

In S320, as in S35 and S110, it is determined whether the predicted usable amount of the ink cartridge 50 of at least one of the ink colors reaches a given threshold value corresponding to an Empty state in a prediction result of S315. The processing executed by the processor 210 in S320 is an example of third determination processing. If there is no ink cartridge 50 that reaches the threshold value, it is determined No, and the process returns to S305 described above, and the same procedure is repeated. If there is at least one ink cartridge 50 that reaches the threshold value, it is determined Yes, and the process proceeds to S325.

In S325, it is determined whether the flag F=1. If the flag F=1, it is determined Yes, and the process returns to S305 described above, and the same procedure is repeated. If the flag F=0, it is determined No, and the process proceeds to S330.

In S330, as in S45 and S120, the "maintenance save function ON/ink save function ON" screen 240A is displayed on the display unit 240. The screen 240A in this case is an example of a fourth confirmation screen, and the processing executed by the processor 210 in S330 is an example of fourth display processing.

In S335, it is determined whether the "Yes" button 240a is pressed on the screen 240A displayed in S330. If the "Yes" button 240a is operated, it is determined Yes, and the process proceeds to S60 to be described later. If the "No" button 240b is operated, it is determined No, and the process proceeds to S350 described above.

In S340, as in S60, the maintenance save function is turned ON, that is, the state in which the maintenance save function is executed is decided as a transition destination. The processing executed by the processor 210 in S340 is also an example of the decision processing. In S345, as in S65, the ink save function is turned ON, that is, the state in which the ink save function is executed is decided as a transition destination. Thereafter, the process proceeds to S360 to be described later.

In S350, as in S240, the maintenance save function is turned OFF, that is, the state in which the maintenance save function is not executed is decided as a transition destination. The processing executed by the processor 210 in S350 is also an example of the decision processing. In S355, the ink save function is turned OFF, that is, the state in which the ink save function is not executed is decided as a transition destination. Thereafter, the process proceeds to S360.

In S360, the flag F is set to 1 corresponding to a fact that the "maintenance save function ON/ink save function ON" screen 240A is displayed. Thereafter, the process returns to S305, and the same procedure is repeated.

In S365 after S305 is determined No, as in S25, S100, and S310, the arrival time information of the contract cartridge 50 is acquired from the arrival time information storage area 234. When the contract cartridge 50 has already arrived, arrival time information and information indicating "arrived" are acquired, and when the contract cartridge 50 has not arrived yet and is being delivered or has not yet been shipped, arrival time information indicating a scheduled arrival date and time is acquired. S365 is also an example of the acquisition step, and the processing executed by the processor 210 in S365 is also an example of the acquisition processing.

In S370, it is determined whether a new contract cartridge 50 has arrived. Specifically, the current time indicated by the current time information of the clock circuit 260 is compared with the scheduled arrival date and time or the arrival completion date and time (hereinafter, simply referred to as an "arrival date and time" as appropriate) indicated by the arrival time information acquired in S365, and it is determined whether the current time is the same as the arrival date and time or has passed the arrival date and time. As described above, instead of determining an arrival of the contract cartridge 50 based on whether the current time is the same as the arrival date and time or has passed the arrival date and time, the arrival of the contract cartridge 50 may be determined based on whether the information indicating "arrived" is acquired from the arrival time information storage area 234 in S365. If the new contract cartridge 50 has arrived, it is determined Yes, and the process proceeds to S375. If the new contract cartridge 50 has not arrived yet, it is determined No, and the process proceeds to S380 to be described later.

In S375, as in S95, the cartridge type information of the ink cartridge 50 being mounted on the cartridge holder 51 is acquired via the communication unit 285, and it is determined whether the new contract cartridge 50 is mounted. If the new contract cartridge 50 is mounted, it is determined Yes, and the process returns to S305 and the same processing is repeated. If the new contract cartridge 50 is not mounted, it is determined No, and the process proceeds to S380.

In S380, as in S30, S105, and S315, a usable amount of the ink cartridge 50 when the arrival time arrives is predicted for each ink color based on the arrival time information acquired in S365 and the use history information stored in the use history information storage area 231C. The processing executed by the processor 210 in S380 is also an example of the prediction processing.

In S385, as in S35, S110, and S320, it is determined whether the predicted usable amount of the ink cartridge 50 of at least one of the ink colors reaches a given threshold value corresponding to an Empty state in a prediction result of S380. If there is at least one ink cartridge 50 that reaches the threshold value, it is determined Yes, and the process proceeds to S390. If there is no ink cartridge 50 that reaches the threshold value, it is determined No, and the process returns to S305 described above, and the same procedure is repeated.

In S390, as in S60 and S340, the maintenance save function is turned ON, that is, the state in which the maintenance save function is executed is decided as a transition destination. The processing executed by the processor 210 in S390 is also an example of the decision processing. In S395, as in S65 and S345, the ink save function is turned ON, that is, the state in which the ink save function is executed is decided as a transition destination.

In S400, the flag F is set to 1 corresponding to a fact that the "maintenance save function ON/ink save function ON" screen 240A is displayed. Thereafter, the process returns to S305, and the same procedure is repeated.

Effects of First Embodiment

As described above, in the present embodiment, the processor 210 executes the acquisition processing in S25, S100, S210, S310, and S365 to acquire the arrival time information of the contract cartridge 50 delivered based on the content of the contract concluded with the contractor. By executing the prediction processing of S30, S105, S220, S315, and S380, the usable amount of the ink cartridge 50 currently mounted on the cartridge holder 51 is predicted at the arrival time indicated by the acquired arrival time information. By executing the decision processing of S60, S85, S240, S340, S350, and S390 according to the prediction result, the execution mode of the maintenance save for weakening the maintenance processing for the multifunction device 200 is decided.

According to the present embodiment, it is possible to appropriately control a save mode of the maintenance processing based on the prediction result of the usable amount when the delivery is completed and the contract cartridge 50 arrives in accordance with a delivery status of the contract cartridge 50.

In the present embodiment, in particular, the first save processing or the second save processing is performed as the maintenance save. By delaying an execution timing of the maintenance processing in the first save processing, the maintenance processing is executed in the ink cartridge 50 that is mounted next to the currently mounted ink cartridge 50, and it is possible to prevent consumption of the currently mounted ink cartridge 50 to extend the life. By reducing the strength of the maintenance processing in the second save processing, it is possible to reduce a degree of consumption of the currently mounted ink cartridge 50 in the maintenance processing, and to extend the life of the currently mounted ink cartridge 50.

In the present embodiment, in particular, in the decision processing of S60, S85, S240, S340, S350, and S390, it is decided whether to execute the maintenance save.

According to the present embodiment, by executing the maintenance save, it is possible to reduce consumption of the currently mounted ink cartridge 50 in the maintenance processing, and it is also possible not to execute the maintenance save which is not necessary.

For example, in a case where a commercially available normal cartridge 50 is mounted and used, a commercially available ink cartridge 50 may be newly purchased in order to cope with the consumption of the normal cartridge 50, but when the delivered contract cartridge 50 arrives, the newly purchased ink cartridge 50 is unnecessary and the purchase cost is wasted.

In the present embodiment, in particular, when it is determined in S20 that the currently mounted ink cartridge 50 is the normal cartridge 50, the maintenance save is executed by the decision in S60, and the consumption of the normal cartridge 50 is prevented and the life of the normal cartridge 50 is extended. Thus, it is possible to prevent waste of the purchase cost.

In the present embodiment, when it is determined that the usable amount when the delivery is completed predicted in the prediction processing of S30, S105, S315, and S380 reaches the threshold value corresponding to Empty, it may be decided to execute the maintenance save in S60, S340, and S390. According to the present embodiment, when it is predicted that the remaining life of the currently mounted ink cartridge 50 at the arrival time of the delivered contract cartridge 50 becomes short, it is possible to execute the maintenance save, and it is possible to prevent the consumption of the currently mounted ink cartridge 50 to extend the life.

In the present embodiment, in particular, when it is determined in S30 that the predicted usable amount reaches the threshold value, the "maintenance save function ON/ink save function ON" screen 240A is displayed on the display unit 240 in S45. According to the present embodiment, the user may confirm approval or disapproval of the execution of the maintenance save on the "maintenance save function ON/ink save function ON" screen 240A, and thus, it is possible to decide whether to finally execute the maintenance save by an intention of the user.

In the present embodiment, in particular, the user approves or disapproves the execution by using the "Yes" button 240a or the "No" button 240b in response to the display of the "maintenance save function ON/ink save function ON" screen 240A in S45, and thus it is possible to select execution or non-execution of the maintenance save according to the intention of the user.

In the present embodiment, in particular, after the user once approves or disapproves the execution of the maintenance save in response to the display of the "maintenance save function ON/ink save function ON" screen 240A, F=1 is set in S55 or S70, and thus the "maintenance save function ON/ink save function ON" screen 240A is not displayed again in S330 thereafter. According to the present embodiment, it is possible to avoid annoyance that the user has once expressed his/her intention but is asked again.

In the present embodiment, in particular, the usable amount of the ink cartridge 50 at the time of contract conclusion is predicted by the prediction processing of S30. According to the present embodiment, it is possible to appropriately control the save mode of the maintenance processing based on the prediction result for the currently mounted ink cartridge 50 immediately after the contract is concluded.

In the present embodiment, in particular, even when it is determined that the usable amount predicted in the prediction processing of S30 does not reach the threshold value, the "maintenance save function ON" screen 240B is displayed on the display unit 240 in S75. According to the present embodiment, the user may confirm approval or disapproval of the execution of the maintenance save on the "maintenance save function ON" screen 240B, and thus it is possible to decide whether to execute the maintenance save in accordance with discretion of the user.

In the present embodiment, in particular, the user approves or disapproves the execution by using the "Yes" button 240a or the "No" button 240b in response to the display of the "maintenance save function ON" screen 240B in S75, and thus it is possible to select execution or non-execution of the maintenance save. According to the present embodiment, even when it is not necessary to extend the life of the ink cartridge 50, it is possible to execute the maintenance save by the discretion of the user, and it is possible to reduce the consumption of the currently mounted ink cartridge 50 to extend the life.

In the present embodiment, in particular, even after the user once approves or disapproves the execution of the maintenance save in response to the display of the "maintenance save function ON" screen 240B, the usable amount of the currently mounted ink cartridge 50 is periodically predicted in the prediction processing of S105. It is determined in S110 whether the periodically predicted usable amount has reached the threshold value, and when it is determined that the usable amount has reached the threshold value, the maintenance save may be executed based on the decision in S60.

According to the present embodiment, even when an actual degree of consumption of the currently mounted ink cartridge 50 varies after the intention of the user regarding the maintenance saving is expressed, it is possible to appropriately control the save mode of the maintenance processing based on a subsequent periodic prediction result.

In the present embodiment, in particular, when it is determined that the usable amount periodically predicted after the intention of the user is expressed in S80 reaches the threshold value, the "maintenance save function ON/ink save function ON" screen 240A is displayed in S120. According to the present embodiment, the user may confirm approval or disapproval of the execution of the maintenance save on the "maintenance save function ON/ink save function ON" screen 240A, and thus, it is possible to decide whether to appropriately execute the maintenance save by the intention of the user.

In the present embodiment, in particular, the user approves or disapproves the execution by using the "Yes" button 240a or the "No" button 240b in response to the display of the "maintenance save function ON/ink save function ON" screen 240A in S120, and thus it is possible to select execution or non-execution of the maintenance save according to the intention of the user.

When the contract cartridge 50 is mounted and used, the other contract cartridge 50 may be mounted in order to cope with the consumption of the contract cartridge 50, and when the delivered contract cartridge 50 arrives and is replaced, the other contract cartridge 50 is unnecessary. However, there is no purchase burden on the user originally, and thus there is no cost waste. As for a user's psychology, there is a need to replace the other contract cartridge 50 with the new contract cartridge 50 even if the other contract cartridge 50 has a sufficient remaining life when the delivered contract cartridge 50 arrives within a relatively short period of time after the other contract cartridge 50 is mounted. However, when the other contract cartridge 50 cannot be prepared, it is desirable to extend the life of the currently mounted ink cartridge 50 as long as possible until the delivered contract cartridge 50 arrives.

In the present embodiment, in view of the above needs, when it is determined in S20 that the currently mounted ink cartridge 50 is the contract cartridge 50, it is selectively decided whether to execute the maintenance save in the decision processing of S240, S340, S350, and S390, and thus it is possible to execute appropriate control for the maintenance processing depending on a circumstance of the user.

In the present embodiment, in particular, after the contract cartridge 50 is mounted on the cartridge holder 51, it is determined in S20 that the currently mounted ink cartridge 50 is the contract cartridge 50, and thereafter, the usable amount of the currently mounted ink cartridge 50 is periodically predicted in S315. It is determined in S320 whether the periodically predicted usable amount has reached the threshold value corresponding to Empty, and when it is determined that the usable amount has reached the threshold value, the maintenance save is executed in S340.

According to the present embodiment, when the contract cartridge 50 is mounted, it is possible to appropriately control the save mode of the maintenance processing based on a subsequent periodic prediction result.

In the present embodiment, in particular, when it is determined that the usable amount predicted in the periodic prediction processing of S315 reaches the threshold value, the "maintenance save function ON/ink save function ON" screen 240A is displayed on the display unit 240 in S330. According to the present embodiment, the user may confirm approval or disapproval of the execution of the maintenance save on the "maintenance save function ON/ink save function ON" screen 240A, and thus, it is possible to decide whether to appropriately execute the maintenance save by the intention of the user.

In the present embodiment, in particular, the user approves or disapproves the execution by using the "Yes" button 240a or the "No" button 240b in response to the display of the "maintenance save function ON/ink save function ON" screen 240A, and thus it is possible to select execution or non-execution of the maintenance save according to the intention of the user.

In the present embodiment, in particular, when it is determined that the usable amount predicted in the periodic prediction processing of S315 does not reach the threshold value corresponding to Empty, S320 is determined No, and thus maintenance save is not performed. According to the present embodiment, the maintenance processing is performed as usual by not performing the maintenance save, and thus it is possible to reliably prevent deterioration of print quality.

SECOND EMBODIMENT

The second embodiment is an embodiment in which a user manually executes maintenance processing.

The multifunction device 200 of the present embodiment has a manual maintenance mode instead of the automatic maintenance mode in the first embodiment. In the manual maintenance mode, the processor 210 of the multifunction device 200 executes the maintenance processing when the user instructs to execute the maintenance processing. As described above, ink in the ink cartridge 50 is consumed when the maintenance processing is executed. For this reason, when the maintenance processing is executed in the manual maintenance mode, the ink is consumed and the ink cartridge 50 is consumed. In the present embodiment, when a maintenance save function is turned ON, a warning screen is displayed on the display unit 240 when reception of an instruction to execute the maintenance processing from the user is prohibited, or when the instruction to execute the maintenance processing is received from the user. Accordingly, consumption of a currently mounted ink cartridge is prevented, and a life of the currently mounted ink cartridge is extended. Hereinafter, details thereof will be described.

Configurations of the print processing system 1, the information management server 100, the multifunction device 200, the mobile terminal 300, the delivery management server 400, and the like in the present embodiment are the same as the configurations shown in FIG. 1, and thus the description thereof will be omitted. A sequence flow executed by a processor of each device is also the same as that in FIGS. 2 to 4, 6, and 7, and thus the description thereof will be omitted. Also in the present embodiment, when the "Yes" button 240*a* is operated on the "maintenance save function ON/ink save function ON" screen 240A shown in FIG. 5A and the "maintenance save function ON" screen 240B shown in FIG. 5B, the maintenance save function is turned ON.

Figure 8:
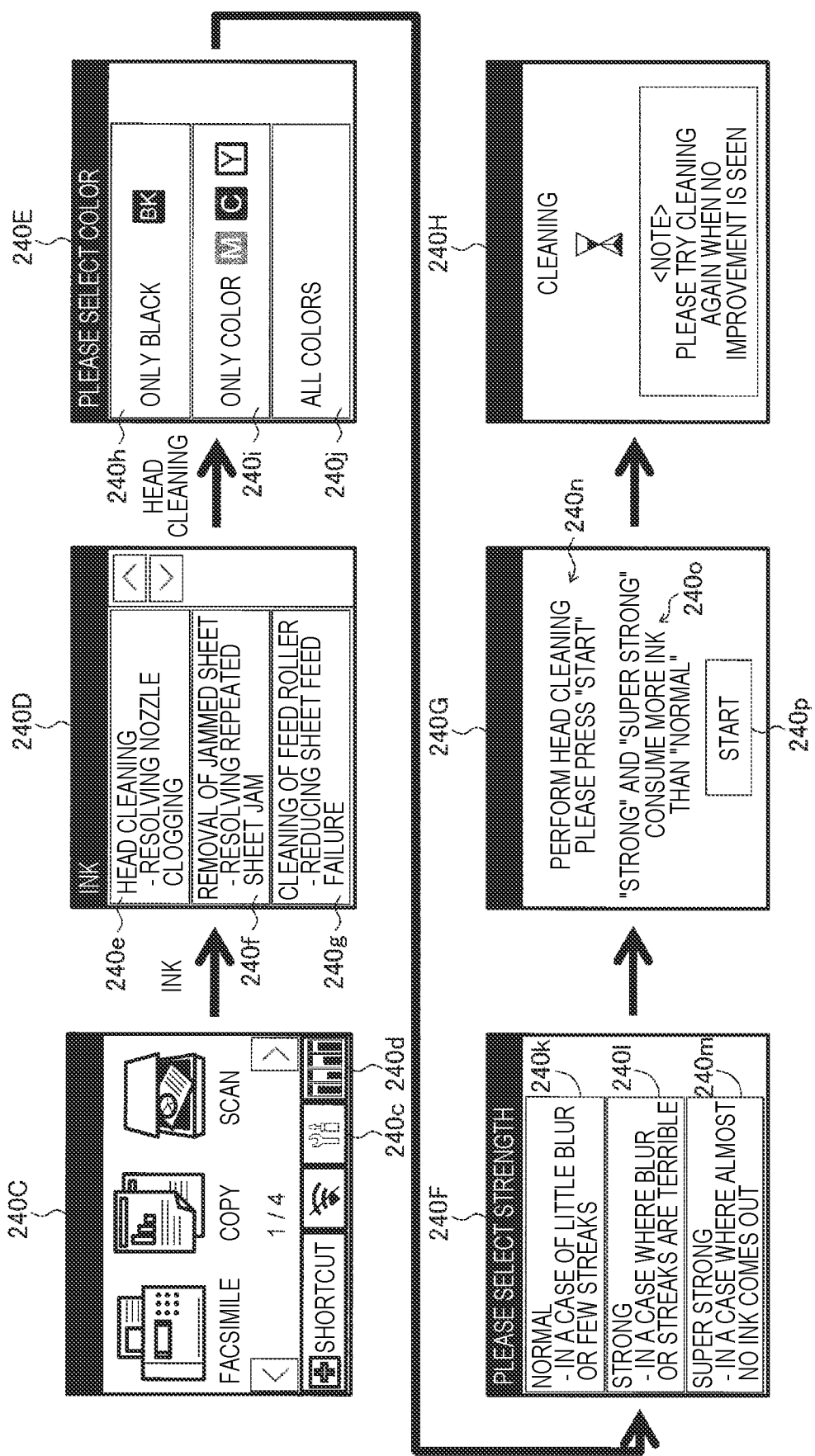
FIG. 8 is an explanatory diagram showing an example of transition of screens displayed on the display unit in a case where maintenance processing is manually executed and a maintenance save function is turned OFF.

FIG. 8 shows an example of transition of screens displayed on the display unit 240 when the maintenance processing is manually executed in a case where the maintenance save function is turned OFF. As shown in FIG. 8, on a standby screen 240C, for example, a setting icon 240*c*, an ink icon 240*d*, and the like are displayed together with icons for facsimile, copy, scan, and the like. When the ink icon 240*d* is selected on the standby screen 240C, the screen transitions to an ink menu screen 240D. For example, when a menu such as maintenance is selected on a setting screen (not shown) displayed when the setting icon 240*c* is selected, the screen may transition to the ink menu screen 240D.

The ink menu screen 240D displays a plurality of menus relating to cleaning. In an example shown in FIG. 8, for example, a "head cleaning" menu 240*e*, a "removal of sheet" menu 240*f*, a "cleaning of feed roller" menu 240*g*, and the like are displayed. When the "head cleaning" menu 240*e* is selected on the ink menu screen 240D, the processor 210 receives an instruction to execute head cleaning, and the screen transitions to a color selection screen 240E.

On the color selection screen 240E, a plurality of menus relating to an ink color of the head that executes cleaning are displayed. In the example shown in FIG. 8, for example, a "only black" menu 240*h*, a "only color" menu 240*i*, an "all colors" menu 240*j*, and the like are displayed. When any one of the menus 240*h*, 240*i*, and 240*j* is selected, the screen transitions to a strength selection screen 240F.

The strength selection screen 240F displays a plurality of menus relating to a strength of cleaning. The strength of the cleaning is, for example, a magnitude of an ejection pressure, an ejection amount, an ejection speed, or the like when the ink is ejected from nozzles in order to discharge thickened ink in the nozzles in a case of performing flushing. Further, the strength of the cleaning is, for example, a magnitude of a suction pressure of a suction pump or a pump rotation speed when the suction pump is driven to suck ink in a flow path of an inkjet head in a case of purging. In the example shown in FIG. 8, for example, a "normal" menu 240*k*, a "strong" menu 240*l*, a "super strong" menu 240*m*, and the like are displayed. When any one of the menus 240*k*, 240*l*, and 240*m* is selected, the screen transitions to a start screen 240G.

On the start screen 240G, for example, a confirmation message 240*n* of executing the head cleaning, a caution message 240*o* regarding an ink consumption amount according to the strength of cleaning, and a "start" button 240*p* are displayed. When the "start" button 240*p* is operated, the screen transitions to an execution screen 240H, and the processor 210 of the multifunction device 200 operates the maintenance unit 290A to execute head cleaning including flushing or purging. The head cleaning is an example of given maintenance processing.

Figure 9:
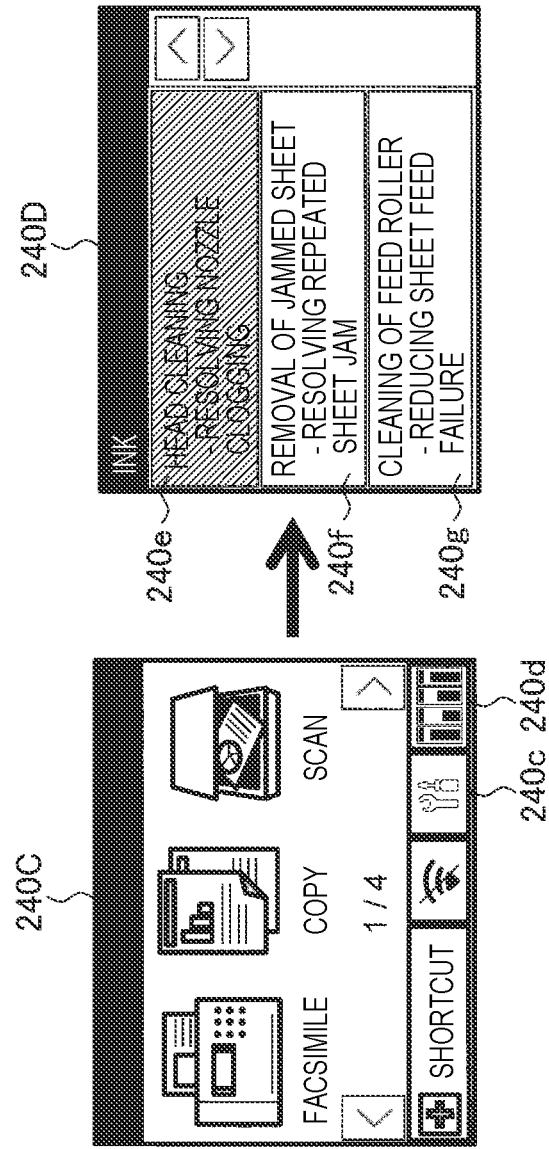

FIG. 9 shows an example of transition of screens displayed on the display unit 240 when the user tries to execute the maintenance processing in a case where the maintenance save function is turned ON. A standby screen 240C and an ink menu screen 240D in FIG. 9 correspond to the standby screen 240C and the ink menu screen 240D in FIG. 8, respectively. As shown in FIG. 9, the standby screen 240C is the same as the case where the maintenance save function is turned OFF. When the ink icon 240*d* is selected on the standby screen 240C, the screen transitions to an ink menu screen 240D. In the ink menu screen 240D, the "head cleaning" menu 240*e* among a plurality of menus 240*e*, 240*f*, and 240*g* is excluded from selection targets, that is, the "head cleaning" menu 240*e* is in a gray-out state, and cannot be selected. Even if the user presses the grayed out menu 240*e*, the processor 210 does not execute processing corresponding to a pressing operation. Accordingly, reception of an instruction to execute the head cleaning from the user is prohibited. The "head cleaning" menu 240*e* is an example of a given menu, and processing of disabling selection of the "head cleaning" menu 240*e* is an example of third save processing.

Figure 10:
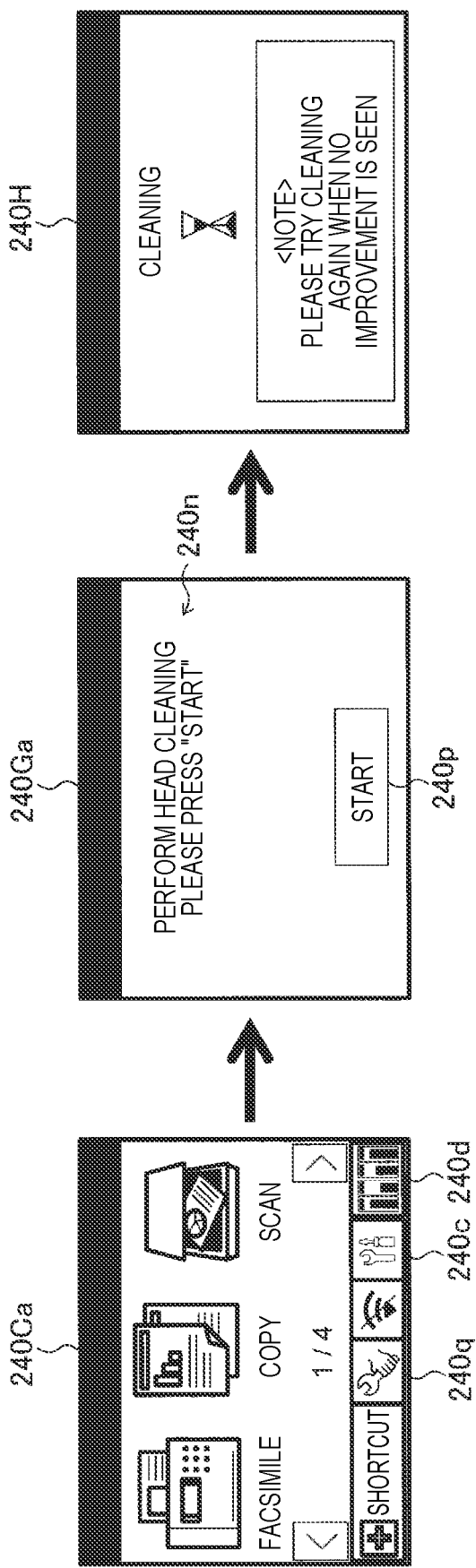
FIG. 10 is an explanatory diagram showing the other example of transition of screens displayed on the display unit in a case where the maintenance processing is manually executed and the maintenance save function is turned OFF.

FIG. 10 shows the other example of transition of screens displayed on the display unit 240 when the maintenance processing is manually executed in the case where the maintenance save function is turned OFF. As shown in FIG. 10, on a standby screen 240Ca, for example, a cleaning icon 240*q* is displayed in addition to the icons for facsimile, copy, scan, and the like, a setting icon 240*c*, an ink icon 240*d*, and the like. When the cleaning icon 240*q* is operated on the standby screen 240Ca, the processor 210 receives an instruction to execute head cleaning, and the screen transitions to a start screen 240Ga without going through the ink menu screen 240D, the color selection screen 240E, and the strength selection screen 240F.

On the start screen 240Ga, a confirmation message 240*n* of executing the head cleaning and a "start" button 240*p* are displayed. In the present modification, an ink color of a head that executes cleaning and a strength of cleaning are fixedly set in advance or are automatically set to appropriate values, and thus the caution message 240*o* relating to the ink consumption amount is not displayed on the start screen 240Ga. When the "start" button 240*p* is operated, the screen transitions to an execution screen 240H, and the head cleaning is executed.

When the multifunction device 200 has, for example, a function of detecting the ejection pressure of the head, the ink color of the head that executes cleaning and the strength of cleaning are automatically set in accordance with a detection result of the ejection pressure. In this case, the ink menu screen 240D shown in FIG. 8 may transition to the start screen 240Ga.

Figure 11:
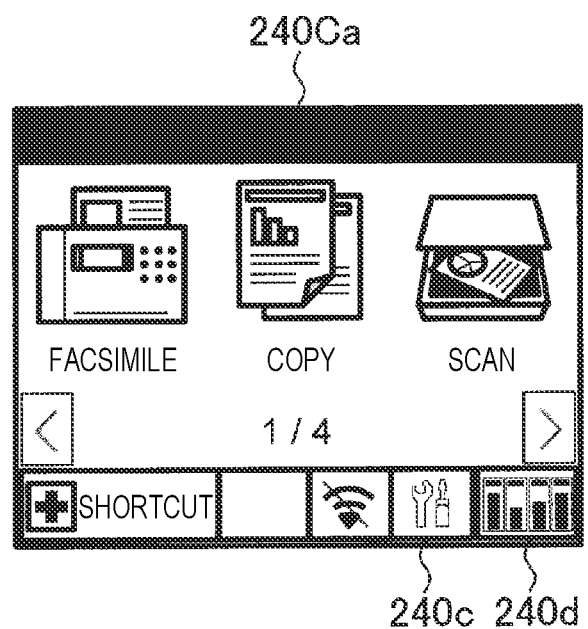

FIG. 11 shows the other example of screens displayed on the display unit 240 when the user tries to execute the maintenance processing in the case where the maintenance save function is turned ON. A standby screen 240Ca of FIG. 11 corresponds to the standby screen 240Ca of FIG. 10. As shown in FIG. 11, the cleaning icon 240*q* is not displayed on the standby screen 240Ca. Accordingly, the user cannot operate the cleaning icon 240*q*, and the reception of the instruction to execute the head cleaning from the user is prohibited. The cleaning icon 240*q* is an example of a given icon, and processing of hiding the cleaning icon 240*q* is an example of the third save processing.

FIG. 12 shows still the other example of transition of screens displayed on the display unit 240 when the user tries to execute the maintenance processing in the case where the maintenance save function is turned ON. A standby screen 240C, an ink menu screen 240D, a color selection screen 240E, and an execution screen 240H in FIG. 12 correspond to the standby screen 240C, the ink menu screen 240D, the color selection screen 240E, and the execution screen 240H in FIG. 8, respectively. As shown in FIG. 12, the standby screen 240C and the ink menu screen 240D are the same as the case where the maintenance save function is turned OFF. When the "head cleaning" menu 240*e* is selected on the ink menu screen 240D, the processor 210 receives an instruction to execute head cleaning, and the screen transitions to a warning screen 240I.

On the warning screen 240*l*, for example, a warning message 240*r* of recommending to perform the head cleaning after the arrival of the ink cartridge 50 since the maintenance save function is turned ON, a confirmation message 240*s* of performing the head cleaning, a "Yes" button 240*t*, and a "No" button 240*u* are displayed. When the "No" button 240*u* is operated, the screen returns to the ink menu screen 240D, and when the "Yes" button 240*t* is operated, the screen transitions to the color selection screen 240E. Subsequent screen transitions are the same as in FIG. 8. The processing of displaying the warning screen 240I on the display unit 240 is an example of fourth save processing.

The warning screen 240I may be displayed, for example, when the cleaning icon 240*q* is operated on the standby screen 240Ca shown in FIG. 10. In this case, when the "No" button 240*u* is operated on the warning screen 240*l*, the screen may return to the standby screen 240Ca, and when the "Yes" button 240*t* is operated, the screen may transition to the start screen 240Ga.

Effects of Second Embodiment

As described above, in the present embodiment, the third save processing is performed as the maintenance save. In the third save processing, by prohibiting the reception of the instruction to execute the maintenance processing from the user, it is possible to prevent consumption of the currently mounted ink cartridge 50 due to execution of manual maintenance processing, and it is possible to extend the life of the currently mounted ink cartridge 50.

In the present embodiment, in particular, the user selects the "head cleaning" menu 240*e* displayed on the display unit 240 to cause the processor 210 to execute the head cleaning. By disabling selection of the "head cleaning" menu 240*e* by the third save processing, it is possible to prohibit the reception of the instruction to execute the maintenance processing from the user, and it is possible to prevent the consumption of the currently mounted ink cartridge 50.

In the present embodiment, in particular, the user operates the cleaning icon 240*q* displayed on the display unit 240 to cause the processor 210 to execute the head cleaning. By hiding the cleaning icon 240*q* by the third save processing, it is possible to prohibit the reception of the instruction to execute the maintenance processing from the user, and it is possible to prevent the consumption of the currently mounted ink cartridge 50.

In the present embodiment, in particular, the fourth save processing is performed as the maintenance save. In the fourth save processing, when the instruction to execute the maintenance processing is received from the user, the warning screen 240I is displayed on the display unit 240. With the warning screen 240*l*, it is possible to warn the user that the maintenance save is being executed, and to reconfirm an intention of the user as to whether to execute the maintenance processing. By displaying the warning screen 240I when the maintenance processing is manually executed, it is possible to alert the user that the maintenance save is being executed. As a result, it is possible to prevent the consumption of the currently mounted ink cartridge, and to extend the life of the currently mounted ink cartridge.

<Modifications>

It should be noted that the present disclosure is not limited to the above embodiments, and, for example, the following modifications are also included in the technical scope.

That is, in the above description, the decision processing of S60, S85, S240, S340, S350, and S390 is executed according to the prediction result in the prediction processing of S30, S105, S220, S315, and S380 and a result of an information input of the user regarding the approval or disapproval of the execution of the maintenance save, but is not limited thereto. That is, the processing may be executed based on only the prediction result in the prediction processing of S30, S105, S220, S315, and S380 without the input of the user.

In the above description, the ink is taken as an example of the consumable, and the remaining amount or the usage amount thereof is taken as an example of the usable amount information, but the present disclosure is not limited thereto. For example, when a laser type multifunction device 200 is used instead of an inkjet type, a toner may be treated as a consumable and a remaining amount or a usage amount thereof may be treated as the usable amount information, or a drum may be treated as a consumable and a remaining life thereof may be treated as the usable amount information.

Further, sequence charts and flowcharts shown in FIGS. 2, 3, 4, 6, 7, and the like do not limit the present disclosure to the procedure shown in the flow, and the procedure may be added or deleted or an order may be changed without departing from the gist and the technical idea of the disclosure.

Regarding constituent elements illustrated in the embodiments and the drawings, shapes, numerical values, or mutual relations of structures or time series of a plurality of constituent elements may be optionally modified and improved within the scope of the technical idea of the present disclosure.

In addition to those described above, methods according to the embodiments and the modifications may be used in combination as appropriate.

The technical problems and advantageous effects of the disclosure are not limited to the contents described above. That is, according to the present disclosure, it is possible to solve problems that are not described above, to achieve effects that are not described above, to solve only a part of the problems that are described, or to achieve only a part of the effects that are described.

In addition, although not individually exemplified, the present disclosure is implemented in various modified forms without departing from the gist thereof.

While the disclosure has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the disclosure, and not limiting the disclosure. Various changes may be made without departing from the spirit and scope of the disclosure. Therefore, the disclosure is intended to embrace all known or later developed alternatives, modifications, variations, improvements, and/or substantial equivalents.

What is claimed is:

1. A printing apparatus configured to operate based on a contract concluded with a contractor related to a consumable for the printing apparatus, the printing apparatus comprising:
  a display;
  a mounting unit configured to receive the consumable;
  a printing unit configured to print an image on a print medium using the mounted consumable; and
  a controller configured to:
    acquire arrival time information of a first consumable delivered for the printing apparatus based on the contract;
    predict a usable amount of the mounted consumable at an arrival time indicated by the acquired arrival time information;
    decide an execution mode of maintenance saving for reducing consumption of the mounted consumable in maintenance processing of the printing apparatus based on the predicted usable amount predicted; and
    display on the display, a first confirmation screen for confirming execution or non-execution of the maintenance saving,
  wherein in a case where the execution or the non-execution of the maintenance saving is selected in the first confirmation screen on the display, the controller is further configured to cause the first confirmation screen not be to subsequently displayed after the execution or the non-execution of the maintenance saving is selected in the first confirmation screen regardless of a subsequent prediction result from a prediction.

2. The printing apparatus according to claim 1, wherein the execution mode of the maintenance saving includes a first save processing mode in which a timing of performing the maintenance processing is delayed or a second save processing mode in which a strength of the maintenance processing is reduced.

3. The printing apparatus according to claim 2, wherein the maintenance saving further includes a third save processing of prohibiting reception of an instruction to execute the maintenance processing.

4. The printing apparatus according to claim 3, wherein the third save processing disables selection of a given menu displayed on the display, the given menu being configured to cause the controller to execute the maintenance processing in response to a selection of the given menu.

5. The printing apparatus according to claim 3, wherein the third save processing hides a given icon displayed on the display, the given icon being configured to cause the controller to execute the maintenance processing in response to an operation to the given icon.

6. The printing apparatus according to claim 2, wherein the maintenance saving further includes a fourth save processing of displaying a warning screen on the display in a case where an instruction to execute the maintenance processing is received.

7. The printing apparatus according to claim 1, wherein the controller further is configured to:
  determine a type of the mounted consumable, and
  decide execution of the maintenance saving in a case where it is determined that the mounted consumable is a second consumable different from the first consumable.

8. The printing apparatus according to claim 7, wherein the decision whether to execute the maintenance saving is executed when the it is determined that the mounted consumable is the first consumable.

9. The printing apparatus according to claim 7, wherein the controller further is configured to:
  determine whether the predicted usable amount has reached a given threshold value, and
    decide execution of the maintenance saving in a case where it is determined that the predicted usable amount has reached the given threshold value.

10. The printing apparatus according to claim 9, further comprising:
  an input unit configured to receive the selection of execution or non-execution of the maintenance-saving,
  wherein the controller executes the decision in accordance with the selection.

11. The printing apparatus according to claim 10, wherein the input unit includes the display configured to display desired information, and
  the controller further causes the display of the first confirmation screen in a case where it is determined that the predicted usable amount has reached the given threshold value.

12. The printing apparatus according to claim 11, wherein the maintenance saving is executed in a case where the execution of the maintenance saving is selected in the first confirmation screen, and the maintenance saving is not executed in a case where the non-execution of the maintenance saving is selected in the first confirmation screen.

13. The printing apparatus according to claim 11, wherein the controller further is configured to display, on the display, a second confirmation screen for confirming execution or non-execution of the maintenance saving in a case where the it is determined that the predicted usable amount does not reach the given threshold value.

14. The printing apparatus according to claim 13, wherein the maintenance saving is executed in a case where the execution of the maintenance saving is selected in the second confirmation screen, and the maintenance saving is not executed in a case where the non-execution of the maintenance saving is selected in the second confirmation screen.

15. The printing apparatus according to claim 9, wherein the controller is configured to periodically predict the usable amount in a case where it is determined that the mounted consumable is the first consumable, the controller further is configured to determine whether the usable amount periodically predicted has reached a given threshold value, and decide execution of the maintenance saving in a case where it is determined that the usable amount periodically predicted has reached the given threshold value.

16. The printing apparatus according to claim 15, wherein the controller is configured to decide non-execution of the maintenance saving in a case where it is determined that the usable amount periodically predicted does not reach the given threshold value.

17. A control method of a printing apparatus configured to operate based on a contract concluded with a contractor related to a consumable for the printing apparatus, the printing apparatus including a mounting unit configured to receive the consumable and a printing unit configured to print an image on a print medium using the mounted consumable, the method comprising:

acquiring arrival time information of a first consumable delivered for the printing apparatus based on the contract;

predicting a usable amount of the mounted consumable at an arrival time indicated by the arrival time information acquired in the acquiring;

deciding an execution mode of maintenance save processing for weakening given maintenance processing for the printing apparatus in accordance with a prediction result in the predicting; and displaying on the display, a first confirmation screen for confirming execution or non-execution of the maintenance saving, wherein in a case where the execution or the non-execution of the maintenance saving is selected in the first confirmation screen on the display, the method further comprises causing the first confirmation screen not be to subsequently displayed after the execution or the non-execution of the maintenance saving is selected in the first confirmation screen regardless of a subsequent prediction result in the predicting.

* * * * *